US012681853B2

(12) United States Patent
Cho

(10) Patent No.: US 12,681,853 B2
(45) Date of Patent: Jul. 14, 2026

(54) STORAGE DEVICE AND METHOD OF OPERATING THE SAME WHERE PARITY DATA OF TARGET LOGICAL PAGE IS STORED IN DIFFERENT PARITY AREAS

(71) Applicant: SK hynix Inc., Icheon-si (KR)

(72) Inventor: Chan Hyeok Cho, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/910,637

(22) Filed: Oct. 9, 2024

(65) Prior Publication Data

US 2025/0321882 A1     Oct. 16, 2025

(30) Foreign Application Priority Data

Apr. 15, 2024     (KR) ........................ 10-2024-0050141

(51) Int. Cl.
*G06F 12/02* (2006.01)

(52) U.S. Cl.
CPC .. *G06F 12/0246* (2013.01); *G06F 2212/7202* (2013.01)

(58) Field of Classification Search
CPC ..................... G06F 12/0246; G06F 2212/7202
See application file for complete search history.

(56) References Cited

U.S. PATENT DOCUMENTS

2017/0315908 A1 * 11/2017 Yang ...................... G06F 11/108
2024/0168668 A1 * 5/2024 Hu ......................... G06F 3/0647

FOREIGN PATENT DOCUMENTS

KR     20230024543 A     2/2023
KR     20230026016 A     2/2023

* cited by examiner

*Primary Examiner* — Chie Yew
(74) *Attorney, Agent, or Firm* — Perkins Coie LLP

(57)     ABSTRACT

Data storage devices and methods of operating the data storage devices are discloses. In an embodiment, a storage device may include a memory device including a plurality of super blocks, each super block including a plurality of logical pages to store a plurality of pieces of logical page data and a plurality of parity areas to store a plurality of pieces of corresponding parity data, and a memory controller configured to determine target logical page data among the plurality of pieces of logical page data based on at least one of a read count or an erase count of a first super block, and control the memory device to store first parity data corresponding to the target logical page data in (1) a first parity area allocated to the first parity data and (2) at least a portion of a second parity area allocated to remaining parity data.

19 Claims, 18 Drawing Sheets

STORAGE DEVICE AND METHOD OF OPERATING THE SAME WHERE PARITY DATA OF TARGET LOGICAL PAGE IS STORED IN DIFFERENT PARITY AREAS

CROSS-REFERENCE TO RELATED APPLICATION

This patent document claims the priority and benefits of Korean patent application number 10-2024-0050141 filed on Apr. 15, 2024, the entire disclosure of which is incorporated herein by reference as part of the disclosure of this patent document.

TECHNICAL FIELD

Various embodiments of the disclosed technology generally relate to semiconductor devices, and more particularly to data storage devices for storing parity data and methods of operating the storage devices.

BACKGROUND

Storage devices store data under the control of a host, for example, a mobile terminal such as a computer, a smartphone, or a tablet, or various other electronic devices. Each storage device may include one or more memory devices that store data and a memory controller that controls the memory device.

Storage devices need to guarantee data integrity by preserving data accurately. In order to guarantee such data integrity, storage devices may utilize various schemes to recover data when the data gets corrupted. For example, storage devices may store parity data corresponding to the data and use may XOR operations with the parity data to recover the original data when the data gets corrupted.

SUMMARY

Various embodiments of the disclosed technology relate to a storage device with improved data recovery performance and a method of operating the storage device.

An embodiment of the disclosed technology may provide for a storage device. The storage device may include a memory device including a plurality of super blocks, each super block including: a plurality of logical pages configured to store a plurality of pieces of logical page data; and a plurality of parity areas configured to store a plurality of pieces of parity data corresponding to the plurality of pieces of logical page data, and a memory controller in communication with the memory device and configured to determine target logical page data corresponding to a target logical page of the plurality of logical pages based on at least one of a read count or an erase count of a first super block of the plurality of super blocks, and control the memory device to store first parity data corresponding to the target logical page data in: (1) a first parity area of the plurality of parity areas that is allocated to the first parity data; and (2) at least a portion of a second parity area that is allocated to remaining pieces of parity data other than the first parity data.

An embodiment of the disclosed technology may provide for a storage device. The storage device may include a memory device including a memory area that include: a logical page area including a plurality of logical pages configured to store a plurality of pieces of logical page data; and a plurality of parity areas configured to store a plurality of pieces of parity data corresponding to the plurality of pieces of logical page data, and a memory controller in communication with the memory device and configured to: determine target logical page data corresponding to a target logical page of the plurality of logical pages based on at least one of a read count or an erase count of the memory area, and control the memory device to store first parity data corresponding to the target logical page data in: (1) a first parity area that is allocated to the first parity data among the plurality of parity areas; and (2) at least a portion of a second parity area that is allocated to remaining pieces of parity data other than the first parity data.

An embodiment of the disclosed technology may provide for a method of operating a storage device, the storage device including a memory area including: a plurality of logical pages configured to store a plurality of pieces of logical page data; and a plurality of parity areas configured to store a plurality of pieces of parity data corresponding to the plurality of pieces of logical page data. The method may include determining whether a read count of the memory area is greater than a first threshold, determining most significant bit (MSB) page data among the plurality of pieces of logical page data to be target logical page data based on a result of the determination, generating first parity data corresponding to the target logical page data, storing the first parity data in a first parity area that is allocated to the first parity data among the plurality of parity areas and in at least a portion of a second parity area that is allocated to remaining pieces of parity data other than the first parity data, generating second parity data corresponding to the remaining pieces of logical page data, and storing the second parity data in a remaining second parity area other than at least the portion of the second parity area.

An embodiment of the disclosed technology may provide for a method of operating a storage device, the storage device including a memory area including: a plurality of logical pages configured to store a plurality of pieces of logical page data; and a plurality of parity areas configured to store a plurality of pieces of parity data corresponding to the plurality of pieces of logical page data. The method may include determining whether a read count of the memory area is less than a first threshold, determining whether an erase count of the memory area is less than a second threshold, determining least significant bit (LSB) page data among the plurality of pieces of logical page data to be target logical page data based on whether the read count is less than the first threshold and whether the erase count is less than the second threshold, generating first parity data corresponding to the target logical page data, storing the first parity data in a first parity area that is allocated to the first parity data among the plurality of parity areas and in at least a portion of a second parity area that is allocated to remaining pieces of parity data other than the first parity data, generating second parity data corresponding to the remaining pieces of logical page data, and storing the second parity data in a remaining second parity area other than at least the portion of the second parity area.

BRIEF DESCRIPTION OF THE DRAWINGS

FIG. 3E is a diagram illustrating an example of a memory area based on an embodiment of the disclosed technology.

FIG. 4 is a diagram illustrating an example in which threshold voltages are shifted due to a read disturbance phenomenon based on an embodiment of the disclosed technology.

FIGS. 7A to 7C are diagrams illustrating an example of a method of storing parity data based on an embodiment of the disclosed technology.

FIG. 8 is a diagram illustrating an example in which threshold voltages are shifted due to a data retention loss phenomenon based on an embodiment.

FIGS. 11A to 11C are diagrams illustrating an example of a method of storing parity data based on an embodiment of the disclosed technology.

DETAILED DESCRIPTION

Specific structural or functional descriptions for certain embodiments disclosed in this patent document are examples only to illustrate certain implementations of the disclosed technology.

Figure 1:
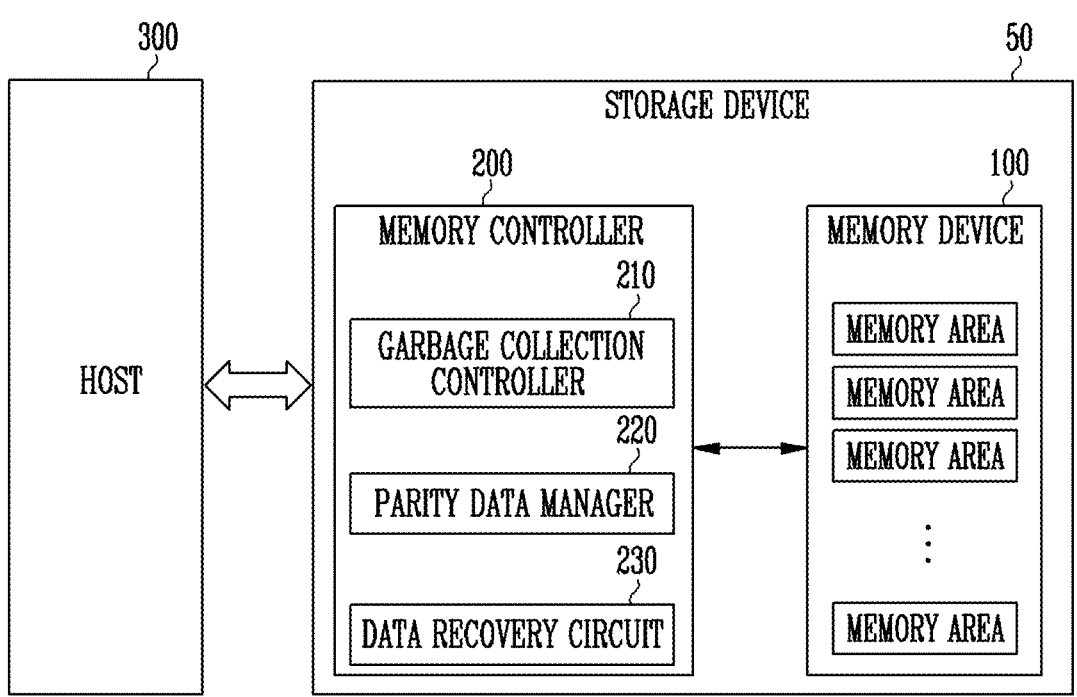
FIG. 1 is a diagram illustrating a storage device based on an embodiment of the disclosed technology.

FIG. 1 is a diagram illustrating a storage device based on an embodiment of the disclosed technology.

Referring to FIG. 1, a storage device 50 may be a device that stores data under the control of a host 300, such as a mobile phone, a smartphone, an MP3 player, a laptop computer, a server computer, a desktop computer, a game console, a television (TV), a tablet personal computer (PC), or an in-vehicle infotainment system.

The storage device 50 may include a memory device 100 and a memory controller 200 that controls the operation of the memory device 100.

The storage device 50 may be implemented as one of various storage devices depending on the communication method with the host 300, such as a solid state drive (SSD), a multimedia card (MMC) or eMMC type-multimedia card, a universal serial bus (USB) storage device, a universal flash storage (UFS) device, a peripheral component interconnection (PCI) or PCI express (PCI-E) card-type storage device, a compact flash (CF) card, a smart media card, and a memory stick.

The storage device 50 may be manufactured in one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may include a plurality of memory blocks configured to store data. Each memory block may include a plurality of memory cells. In an embodiment, each of the memory cells may be implemented as a single-level cell (SLC) configured to store one data bit. In an embodiment, each of the memory cells may be implemented as a multi-level cell (MLC) configured to store two data bits, a triple-level cell (TLC) configured to store three data bits, or a quad-level cell (QLC) configured to store four data bits. In this case, each of the plurality of memory cells may be programmed (or written) into one of a plurality of program states distinguished from each other based on threshold voltages.

In some embodiments of the disclosed technology, the memory cells may be implemented as TLC. However, the disclosed technology is not limited thereto, and the same description may be applied to memory cells implemented in other forms.

In some embodiments, the memory device 100 may include a plurality of memory areas. Each memory area may be an area that can store data, and may refer to any of various types of areas that can store data, such as a page, a memory block, a plane, a die, and a super block.

In an embodiment, the memory area may store a plurality of pieces of logical page data. For example, the plurality of pieces of logical page data may include most significant bit (MSB) page data, central significant bit (CSB) page data, and least significant bit (LSB) page data.

In an embodiment, the memory area may store a plurality of pieces of parity data corresponding to the plurality of pieces of logical page data. For example, the memory area may include a plurality of parity areas allocated to the plurality of pieces of parity data.

In an embodiment, the memory device 100 may be a nonvolatile memory, which retains data even when the power is interrupted. In some embodiments of the disclosed technology, the memory device 100 is a NAND flash memory.

In an embodiment, the memory device 100 may receive a command and an address from the memory controller 200. The memory device 100 may perform an operation indicated by the command on an area selected by the address. For example, the memory device 100 may perform a write operation (or a program operation), a read operation, and an erase operation.

The memory controller 200 may control the overall operation of the storage device 50.

When power is applied to the storage device 50, the memory controller 200 may run the firmware (FW). When the memory device 100 is a flash memory device, the firmware (FW) may include a host interface layer (HIL), which controls communication with the host 300, a flash translation layer (FTL), which controls communication between the host 300 and the memory device 100, and a flash interface layer (FIL), which controls communication with the memory device 100.

In an embodiment, the memory controller 200 may receive data and a logical block address (LBA) from the host 300, and may translate the logical block address (LBA) into a physical block address (PBA) that indicates the address of memory cells included in the memory device 100 and in which data is to be stored. In some embodiments, a logical block address and a "logical address" may be used to have the same meaning. In some embodiments, the terms "physical block address" and "physical address" may be used to indicate the actual location of data.

In an embodiment, the memory controller 200 may provide, to the memory device 100, a command, an address, or data corresponding to a program operation, a read operation or an erase operation, to perform the corresponding operation in response to a request of the host 300.

In an embodiment, the memory controller 200 may independently generate a command, an address, and data regardless of whether the request of the host 300 is received, and may transmit them to the memory device 100. For example, the memory controller 200 may provide the memory device 100 with commands, addresses, and data required for performing program operations and read operations associated with performance of internal operations such as a wear leveling operation, a read reclaim operation, and a garbage collection operation.

In an embodiment, the memory controller 200 may include a garbage collection controller 210, a parity data manager 220, and a data recovery circuit 230. Each of the garbage collection controller 210 and the parity data manager 220 may include: one or more processors that can perform operations allocated thereto, respectively; and one or more memory devices. In an embodiment, unlike the example illustrated in FIG. 1, the garbage collection controller 210 and the parity data manager 220 may be implemented as a single component.

In an embodiment, the garbage collection controller 210 may control a garbage collection operation. For example, the garbage collection controller 210 may select a victim super block from among a plurality of super blocks, and may copy valid data included in the victim super block to a new super block. Thereafter, the garbage collection controller 210 may generate an empty super block by erasing the victim super block. Although, in the above-described example, the garbage collection operation is illustrated as being performed on a super block basis, the disclosed technology is not limited thereto, and the garbage collection operation may be performed on the basis of various memory areas such as a memory block, a plane, and a die.

In an embodiment, the parity data manager 220 may manage parity data corresponding to data. The parity data may be data used for a data recovery operation and may be generated through an XOR operation with the corresponding data.

In an embodiment, when the memory cells are implemented as TLC, the super block may store data corresponding to a plurality logical pages such as MSB page data, CSB page data, and LSB page data. In this case, the parity data manager 220 may manage parity data corresponding to MSB page data, CSB page data, and LSB page data, respectively. For example, the parity data manager 220 may control the memory device 100 to store a plurality of pieces of parity data, corresponding to the MSB page data, the CSB page data, and the LSB page data, in parity areas allocated to the pieces of parity data, respectively.

In an embodiment, the parity data manager 220 may determine target logical page data among the plurality of pieces of logical page data based on at least one of a read count and an erase count of the victim super block. For example, when at least one of various conditions is satisfied, such as an occurrence condition for a data migration operation, an occurrence condition for a wear leveling operation, an occurrence condition for a read reclaim operation, an occurrence condition for a garbage collection operation, and conditions associated with a specific cycle, and user settings, the parity data manager 220 may determine the target logical page data. For the sake of explanation, the following describes an example in which the target logical page data is determined when the garbage collection operation is triggered.

In an embodiment, when the garbage collection operation is triggered, the parity data manager 220 may determine target logical page data among a plurality of pieces of logical page data based on at least one of a read count and an erase count of a victim super block. In this case, the target logical page data (e.g., data corresponding to the target logical page) may be logical page data with a higher probability of read failure than logical page data corresponding to other logical pages during a read operation. In some implementations, the term "logical page data" can be used to indicate data corresponding to (or stored in) a logical page. Furthermore, the parity data manager 220 may store parity data corresponding to the target logical page data in a parity area allocated to the corresponding parity data, and may additionally store the parity data in at least a portion of a parity area allocated to other parity data corresponding to the remaining logical page data (e.g., data corresponding to the remaining logical pages). That is, when logical page data with a higher probability of read failure is detected, the parity data manager 220 may increase the data recovery probability of the target logical page data by additionally allocating at least a portion of the parity area allocated to parity data corresponding to logical page data with a lower probability of read failure, to the parity data corresponding to the target logical page data.

In an embodiment, the data recovery circuit 230 may perform a data recovery operation. When a read operation for the data fails, an uncorrectable error correction code (UECC) error may occur. In some implementations, such a UECC error can be prevented by performing a data recovery operation that includes an operation of recovering data when the corresponding data is correctable, preventing UECC errors from occurring. For example, the data recovery circuit 230 may recover the corresponding data by performing an XOR operation based on the corresponding data and parity data corresponding thereto.

In an embodiment, the data recovery circuit 230 may perform error correction when data is written to or read from the memory device 100. For example, the error recovery circuit 230 may perform error correcting code (ECC) encoding based on the data to be written to the memory device 100. The encoded data may be transferred to the memory device 100. The data recovery circuit 230 may perform error correction code decoding on the data received from the memory device 100.

The host 300 may communicate with the storage device 50 using at least one of various communication methods such as universal serial bus (USB), serial AT attachment (SATA), serial Attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
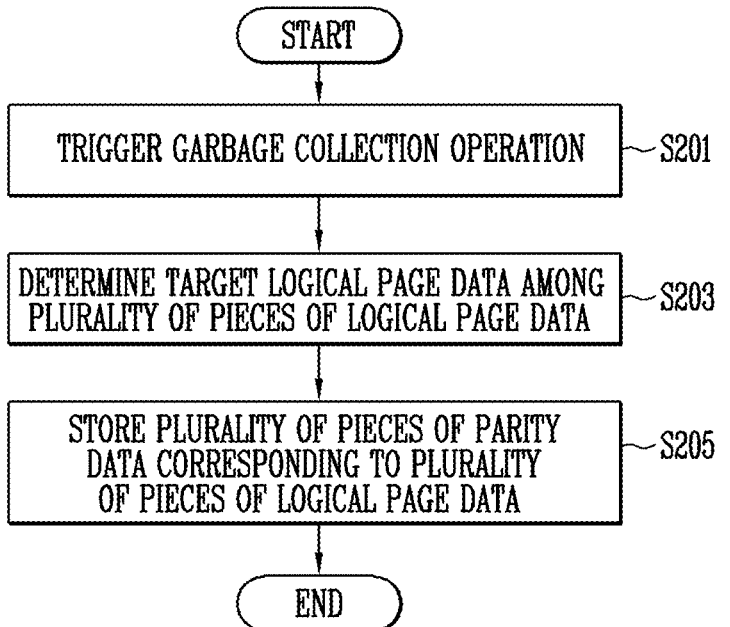
FIG. 2 is a flowchart illustrating a method of operating a storage device based on an embodiment of the disclosed technology.

FIG. 2 is a flowchart illustrating a method of operating a storage device based on an embodiment of the disclosed technology.

The example operations illustrated in FIG. 2 may be performed by, for example, the storage device 50 illustrated in FIG. 1.

Referring to FIG. 2, at S201, the storage device 50 may trigger a garbage collection operation. The garbage collection operation may be triggered at a regular cycle or whenever the number of empty super blocks becomes less than or equal to a certain number. In some implementations, although the case where the garbage collection operation is triggered in the storage device 50 at S201 is illustrated in FIG. 2, the disclosed technology is not limited thereto. For example, at S201, the storage device 50 may satisfy at least one of various conditions such as an occurrence condition for a data migration operation that moves data from a memory location to another memory location, an occurrence condition for a wear leveling operation, an occurrence condition for a read reclaim operation that periodically migrates valid data pages of a block to another free block to avoid read disturb errors, a condition associated with a specific cycle, and a condition associated with user settings.

At S203, the storage device 50 may determine target logical page data with a higher probability of read failure than other pieces of logical page data among a plurality of pieces of logical page data.

For example, the storage device 50 may determine the target logical page data based on at least one of a read count and an erase count of a victim super block.

At S205, the storage device 50 may store a plurality of pieces of parity data corresponding to the plurality of pieces of logical page data.

In an embodiment, the storage device 50 may store first parity data corresponding to the target logical page data (1) in a first area that is allocated to the first parity data and (2) in at least a portion of a second parity area that is allocated to the remaining pieces of parity data, other than the first parity data.

Figures 3A, 3B:
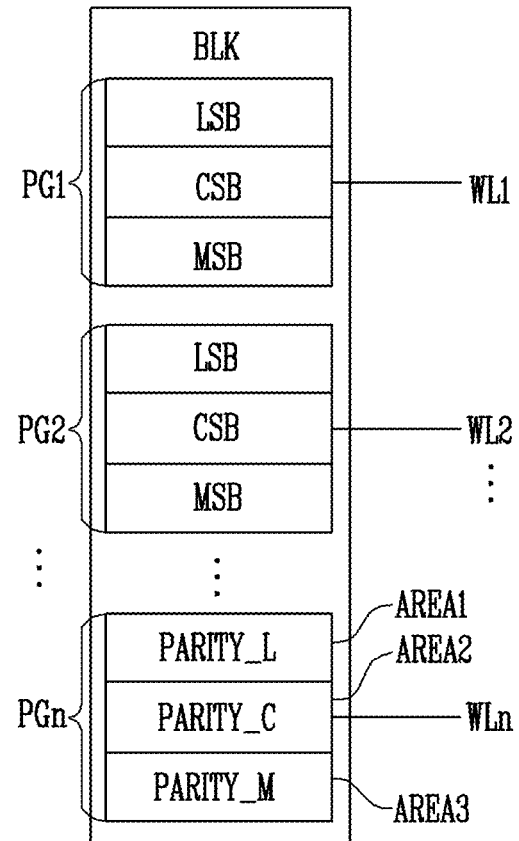
FIG. 3A is a diagram illustrating an example of a memory area based on an embodiment of the disclosed technology.
FIG. 3B is a diagram illustrating an example of a memory area based on an embodiment of the disclosed technology.

FIG. 3A is a diagram illustrating an example of a memory area based on an embodiment of the disclosed technology.

Referring to FIG. 3A, the memory area may refer to a page. The page may include a plurality of memory cells connected to the same word line WL.

In an embodiment, the page may store a plurality of pieces of logical page data LSB, CSB, and MSB and a plurality of pieces of parity data PARITY_L, PARITY_C, and PARITY_M. For example, the page may include a plurality of parity areas AREA1 to AREA3. The plurality of parity areas AREA1 to AREA3 may be allocated to store the plurality of pieces of parity data PARITY_L, PARITY_C, and PARITY_M. The first parity area AREA1 may be allocated to LSB parity data PARITY_L corresponding to the LSB page data. The second parity area AREA2 may be allocated to CSB parity data PARITY_C corresponding to the CSB page data. The third parity area AREA3 may be allocated to MSB parity data PARITY_M corresponding to the MSB page data.

In an embodiment, the plurality of parity areas AREA1 to AREA3 may have the same size. The ratio of the size of the plurality of pieces of logical page data LSB, CSB, and MSB and the size of the plurality of pieces of parity data PARITY_L, PARITY_C, and PARITY_M may be set variously based on embodiments.

FIG. 3B is a diagram illustrating an example of a memory area based on an embodiment of the disclosed technology.

Referring to FIG. 3B, in some embodiments, the memory area may refer to a memory block BLK. The memory block BLK may be connected to a plurality of word lines WL1 to WLn. The memory block BLK may include a plurality of pages PG1 to PGn connected to the plurality of word lines WL1 to WLn.

In an embodiment, the memory block BLK may store a plurality of pieces of logical page data LSB, CSB, and MSB. For example, each of the first to n–1-th pages PG1 to PGn–1 included in the memory block BLK may store the plurality of pieces of logical page data LSB, CSB, and MSB.

In an embodiment, the memory block BLK may store a plurality of pieces of parity data PARITY_L, PARITY_C, and PARITY_M. For example, the memory block BLK may include a plurality of parity areas AREA1 to AREA3. The first parity area AREA1 may be allocated to LSB parity data PARITY_L corresponding to the LSB page data. The second parity area AREA2 may be allocated to CSB parity data PARITY_C corresponding to the CSB page data. The third parity area AREA3 may be allocated to MSB parity data PARITY_M corresponding to the MSB page data.

In an embodiment, the plurality of parity areas AREA1 to AREA3 may be included in any one of the plurality of pages PG1 to PGn included in the memory block BLK. For example, the n-th page PGn included in the memory block BLK may store the plurality of pieces of parity data PARITY_L, PARITY_C, and PARITY_M.

Although FIG. 3B illustrates the plurality of parity areas AREA1 to AREA3 as being included in any one page, the disclosed technology is not limited thereto. For example, the plurality of parity areas AREA1 to AREA3 may be included in at least two pages among the plurality of pages PG1 to PGn.

Figure 3C:
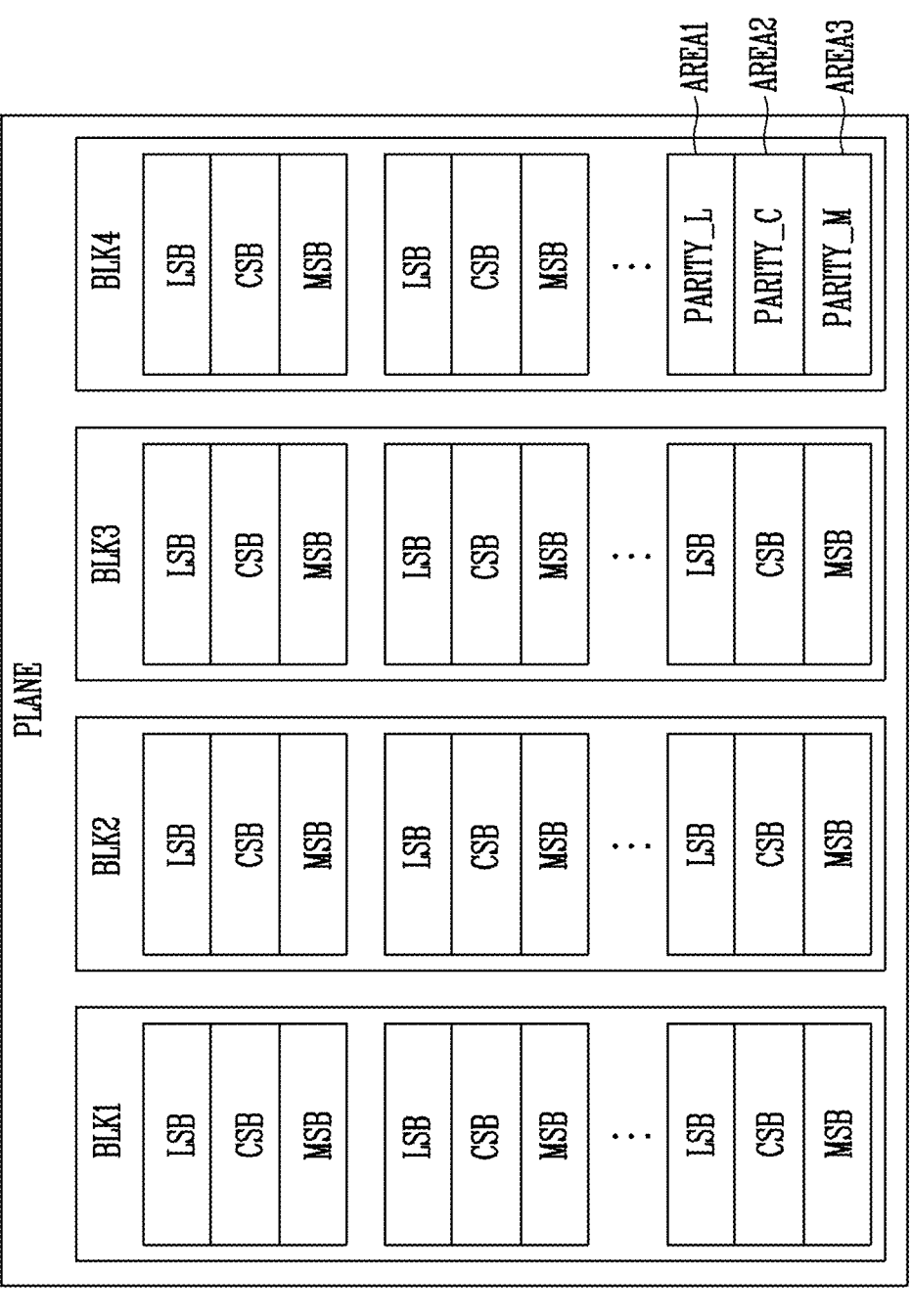
FIG. 3C is a diagram illustrating an example of a memory area based on an embodiment of the disclosed technology.

FIG. 3C is a diagram illustrating an example of a memory area based on an embodiment of the disclosed technology.

Referring to FIG. 3C, in some embodiments, the memory area may refer to a plane. The plane may include a plurality of memory blocks BLK1 to BLK4. Although FIG. 3C shows one plane includes four memory blocks BLK1 to BLK4 by way of example, the number of memory blocks included in the plane may be less than or equal to 4 or may be equal to or greater than 4 depending on embodiments.

In an embodiment, the plane may store a plurality of pieces of logical page data LSB, CSB, and MSB. For example, each of the first to third memory blocks BLK1 to BLK3 may store a plurality of pieces of logical page data LSB, CSB, and MSB. In addition, a portion of the fourth memory block BLK4 may store the plurality of pieces of logical page data LSB, CSB, and MSB.

In an embodiment, the plane may store a plurality of pieces of parity data PARITY_L, PARITY_C, and PARITY_M. For example, the plane may include a plurality of parity areas AREA1 to AREA3. The first parity area AREA1 may be allocated to LSB parity data PARITY_L corresponding to the LSB page data. The second parity area AREA2 may be allocated to CSB parity data PARITY_C corresponding to the CSB page data. The third parity area AREA3 may be allocated to MSB parity data PARITY_M corresponding to the MSB page data.

In an embodiment, the plurality of parity areas AREA1 to AREA3 may be included in any one of the plurality of memory blocks BLK1 to BLK4 included in the plane. For example, the fourth memory block BLK4 may include the plurality of parity areas AREA1 to AREA3. In some implementations, the plurality of parity areas AREA1 to AREA3 may be included in any one of the plurality of pages included in the fourth memory block BLK4.

Although FIG. 3C illustrates the plurality of parity areas AREA1 to AREA3 as being included in a portion of any one block, the disclosed technology is not limited thereto. In an example, the plurality of parity areas AREA1 to AREA3 may be included in at least two pages among the plurality of pages included in the fourth memory block BLK4. In an example, the plurality of parity areas AREA1 to AREA3 may be included in the entire area of the fourth memory block BLK4. In an example, the plurality of parity areas AREA1 to AREA3 may be included in at least two memory blocks among the plurality of memory blocks BLK1 to BLK4.

Figure 3D:
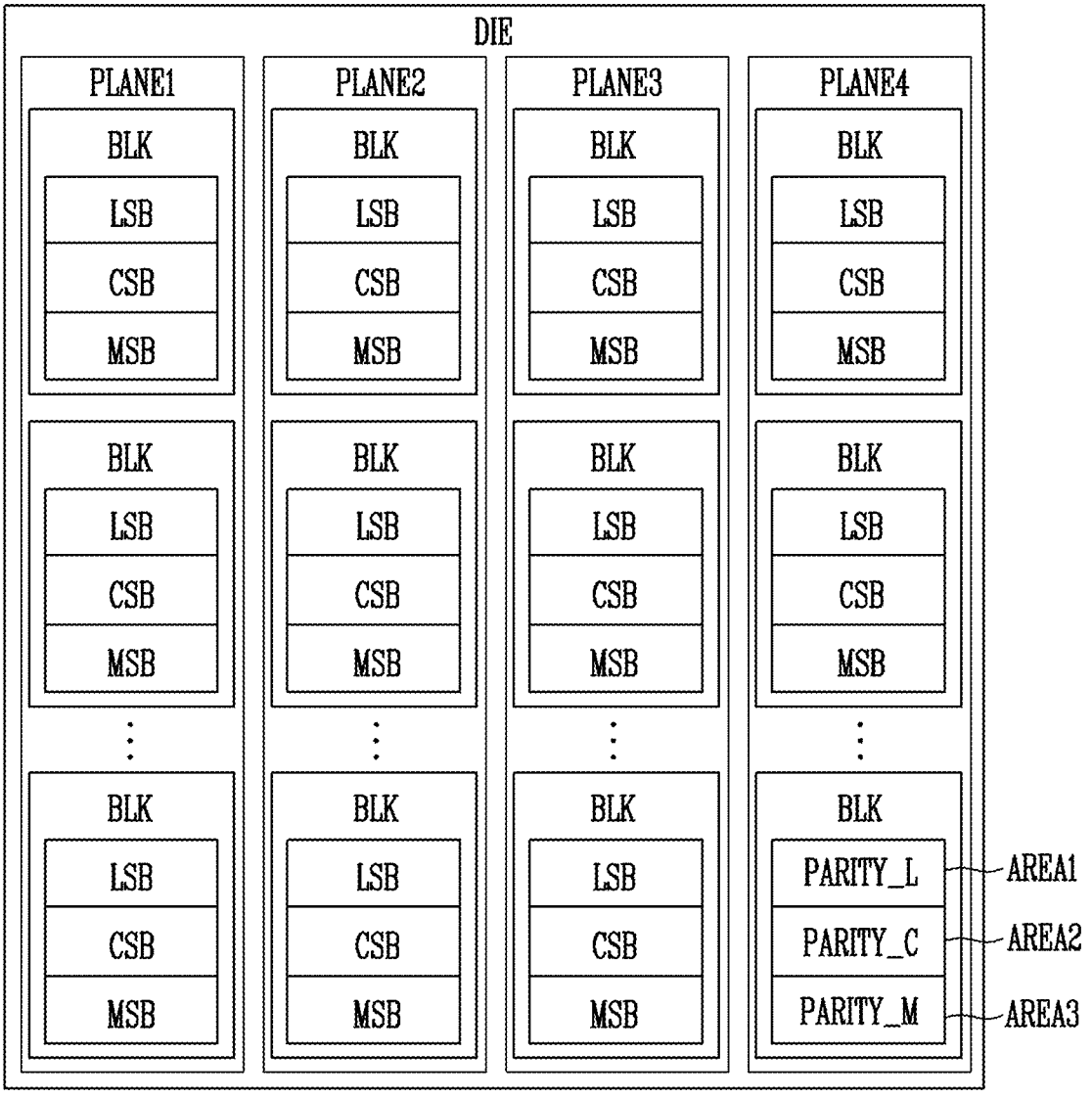
FIG. 3D is a diagram illustrating an example of a memory area based on an embodiment of the disclosed technology.

FIG. 3D is a diagram illustrating an example of a memory area based on an embodiment of the disclosed technology.

Referring to FIG. 3D, in some embodiments, the memory area may refer to a die. The die may include a plurality of planes PLANE1 to PLANE4. Each of the plurality of planes PLANE1 to PLANE4 may include a plurality of memory blocks BLK. Although FIG. 3D shows one die includes four planes PLANE1 to PLANE4 by way of example, the number of planes included in the die may be less than or equal to 4, or may be equal to or greater than 4 depending on embodiments.

In an embodiment, the die may store a plurality of pieces of logical page data LSB, CSB, and MSB. For example, each of the plurality of memory blocks BLK included in each of the first to third planes PLANE1 to PLANE3 may store a plurality of pieces of logical page data LSB, CSB, and MSB. Furthermore, some of the plurality of memory blocks BLK included in the fourth plane PLANE4 may store a plurality of pieces of logical page data LSB, CSB, and MSB.

In an embodiment, the die may store a plurality of pieces of parity data PARITY_L, PARITY_C, and PARITY_M. For example, the die may include a plurality of parity areas AREA1 to AREA3. The first parity area AREA1 may be allocated to LSB parity data PARITY_L corresponding to the LSB page data. The second parity area AREA2 may be allocated to CSB parity data PARITY_C corresponding to the CSB page data. The third parity area AREA3 may be allocated to MSB parity data PARITY_M corresponding to the MSB page data.

In an embodiment, the plurality of parity areas AREA1 to AREA3 may be included in any one of the plurality of memory blocks BLK included in the die. For example, any one memory block BLK included in the fourth plane PLANE4 include the plurality of parity areas AREA1 to AREA3. Here, the plurality of parity areas AREA1 to AREA3 may be included in a partial area or the entire area of any one memory block BLK included in the fourth plane PLANE4.

Although FIG. 3D illustrates the plurality of parity areas AREA1 to AREA3 as being included in the same block, the disclosed technology is not limited thereto. In an example, the plurality of parity areas AREA1 to AREA3 may be included in different memory blocks, e.g., at least two of the plurality of memory blocks BLK included in the fourth plane PLANE4. In an example, the plurality of parity areas AREA1 to AREA3 may be included in the plurality of memory blocks BLK included in at least two of the plurality of planes PLANE1 to PLANE4.

Figure 3E:
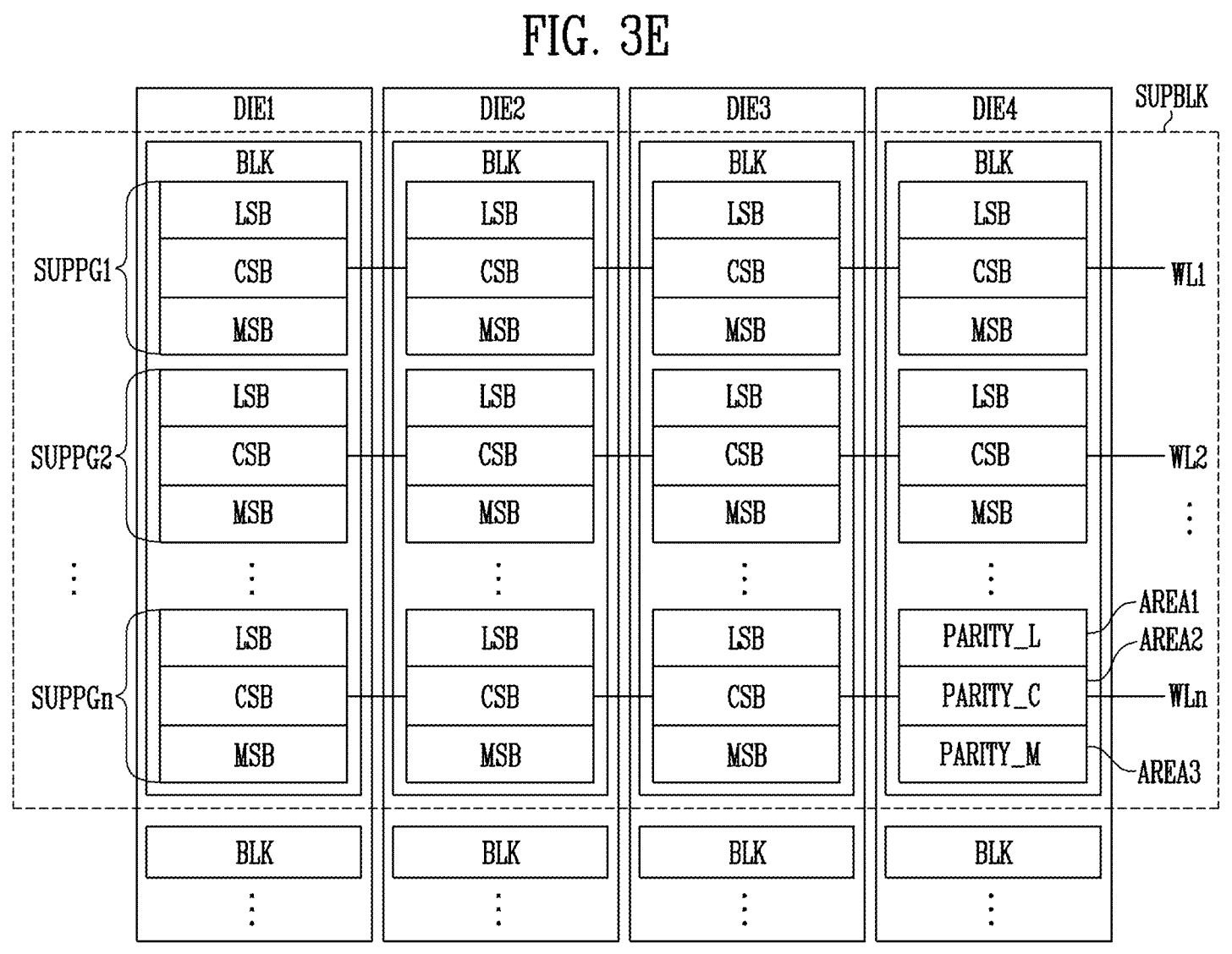

FIG. 3E is a diagram illustrating an example of a memory area based on an embodiment of the disclosed technology.

Referring to FIG. 3E, the memory device 100 may include a plurality of dies DIE1 to DIE4. Although FIG. 3E illustrates the memory device 100 as including four dies DIE to DIE4 by way of example, the disclosed technology is not limited thereto, and the number of dies included in the memory device 100 may be less than 4, or equal to or greater than 4.

In an embodiment, the memory area may refer to a super block SUPBLK. The super block SUPBLK may include a plurality of memory blocks BLK included in different dies among the plurality of dies DIE1 to DIE4. Also, the super block SUPBLK may include a plurality of memory blocks BLK included in different planes among a plurality of planes. As shown in FIG. 3E, in some implementations, the super block is described as including a plurality of blocks BLK included in different dies.

In an embodiment, the super block SUPBLK may include a plurality of pages. Each page may include a plurality of memory cells connected to one word line. The super block SUPBLK may include a plurality of memory cells connected to a plurality of word lines WL1 to WLn such that memory cells corresponding to a page are connected to the same word line. A plurality of pages included in different dies while being connected to one word line may be referred to as a super page. For example, a plurality of pages included in the plurality of dies DIE1 to DIE4 while being connected to the first word line WL1 may form a first super page SUPPG1. Further, a plurality of pages included in the plurality of dies DIE1 to DIE4 while being connected to the second word line WL2 may form a second super page SUPPG2. Furthermore, a plurality of pages included in the plurality of dies DIE1 to DIE4 while being connected to the n-th word line WLn may form an n-th super page SUPPGn.

Each of the plurality of super pages SUPPG1 to SUPPGn may store a plurality of pieces of logical page data. For example, each of the plurality of super pages SUPPG1 to SUPPGn may include MSB page data, CSB page data, and LSB page data.

In an embodiment, the super block SUPBLK may store a plurality of pieces of parity data PARITY_L, PARITY_C, and PARITY_M corresponding to the plurality of pieces of logical page data. For example, the super block SUPBLK may include a memory block BLK included in the fourth die DIE4. Here, the memory block BLK included in the fourth die DIE4 may include a plurality of pages, and any one of the plurality of pages may include a plurality of parity areas AREA1 to AREA3. The plurality of parity areas AREA1 to AREA3 may be allocated to store the plurality of pieces of parity data PARITY_L, PARITY_C, and PARITY_M.

Although FIG. 3E illustrates the plurality of parity areas AREA1 to AREA3 as being included in any one page included in the memory block BLK of the fourth die DIE4, the disclosed technology is not limited thereto. In an example, the plurality of parity areas AREA1 to AREA3 may be included in at least two of the plurality of pages included in the memory block BLK of the fourth die DIE4. In an example, the plurality of parity areas AREA1 to AREA3 may be included in the memory block BLK of the die DIE1, DIE2, or DIE3, other than the fourth die DIE4, among the plurality of memory blocks BLK included in the super block SUPBLK. In an example, the plurality of parity areas AREA1 to AREA3 may be included in memory blocks BLK of at least two dies among the plurality of memory blocks BLK included in the super block SUPBLK.

In some implementations, as shown in FIGS. 4 to 12, a memory area is a super block SUPBLK. However, what is discussed below with reference to FIGS. 4 to 12 may be applied to the cases where the memory area is a page, a memory block, a plane, or a die.

Figure 4:
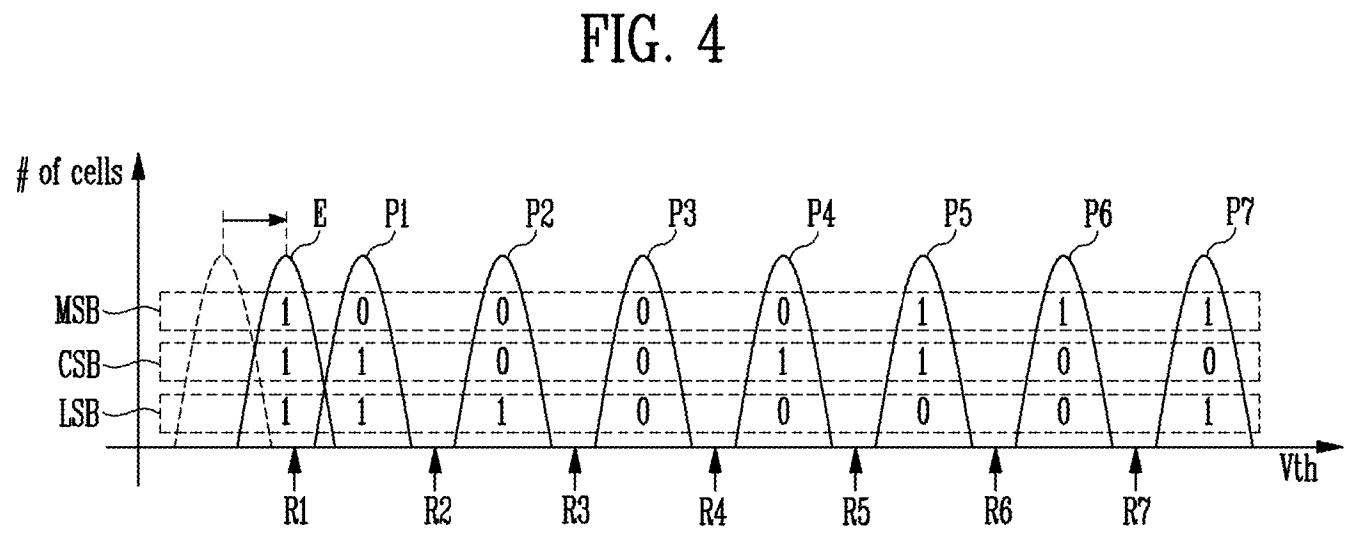

FIG. 4 is a diagram illustrating an example of threshold voltages that shift due to read disturbance phenomena based on an embodiment of the disclosed technology.

Referring to FIG. 4, a horizontal axis denotes threshold voltages of memory cells and a vertical axis denotes the number of memory cells.

The selected memory cells connected to the selected word line may have a threshold voltage distribution corresponding to an erase state (E) before a program operation is performed.

Each memory cell may be programmed to have a threshold voltage corresponding to any one of an erase state E, a first program state P1, a second program state P2, a third program state P3, a fourth program state P4, a fifth program state P5, a sixth program state P6, and a seventh program state P7.

The erase state E may correspond to data "111," the first program state P1 may correspond to data "011," the second program state P2 may correspond to data "001," the third program state P3 may correspond to data "000," the fourth program state P4 may correspond to data "010," the fifth program state P5 may correspond to data "110," the sixth program state P6 may correspond to data "100," and the seventh program state P7 may correspond to data "101." However, pieces of data corresponding to respective program states are provided as examples only, and may be modified in various forms.

Memory cells connected to one word line may be defined as one physical page, and memory cells included in one physical page may store LSB page data, CSB page data, and MSB page data.

When the program operation is terminated, each of the selected memory cells may have a threshold voltage corresponding to any one of the erase state E, the first program state P1, the second program state P2, the third program state P3, the fourth program state P4, the fifth program state P5, the sixth program state P6, and the seventh program state P7. The memory device 100 may read data stored in the selected memory cells by performing a read operation using a first read voltage R1 to a seventh read voltage R7.

Here, the first read voltage R1 may be a read voltage for distinguishing the erase state E from the first program state P1, the second read voltage R2 may be a read voltage for distinguishing the first program state P1 from the second program state P2, the third read voltage R3 may be a read voltage for distinguishing the second program state P2 from the third program state P3, the fourth read voltage R4 may be a read voltage for distinguishing the third program state P3 from the fourth program state P4, the fifth read voltage R5 may be a read voltage for distinguishing the fourth program state P4 from the fifth program state P5, a sixth read voltage R6 may be a voltage distinguish the fifth program state P5 from the sixth program state P6, and a seventh read voltage R7 may be a read voltage for distinguishing the sixth program state P6 from the seventh program state P7.

In some implementations, the read disturbance phenomenon may occur as the threshold voltage of an adjacent memory cell changes when a memory cell is read. In an example, the threshold voltages of memory cells in the erase state E may increase due to the influence of the read voltage applied to adjacent memory cells. In this case, when a read operation is performed on the corresponding memory cells, the probability that the read operation will fail may be high. For example, memory cells in the erase sate E and the memory cells in the first program state P1 may be different from each other in MSB page data, and may be identical to each other in LSB page data and CSB page data. In this case, the memory cells in the erase state E and the memory cells in the first program state P1 may be distinguished from each other based on the first read voltage R1. However, when the threshold voltages of the memory cells in the erase state E increase, it is impossible to accurately distinguish the memory cells in the erase state E from the memory cells in the first program state P1, thus making it difficult to accurately read pieces of MSB page data having different values. Accordingly, the MSB page data may have a higher probability of read failure.

Figure 5:
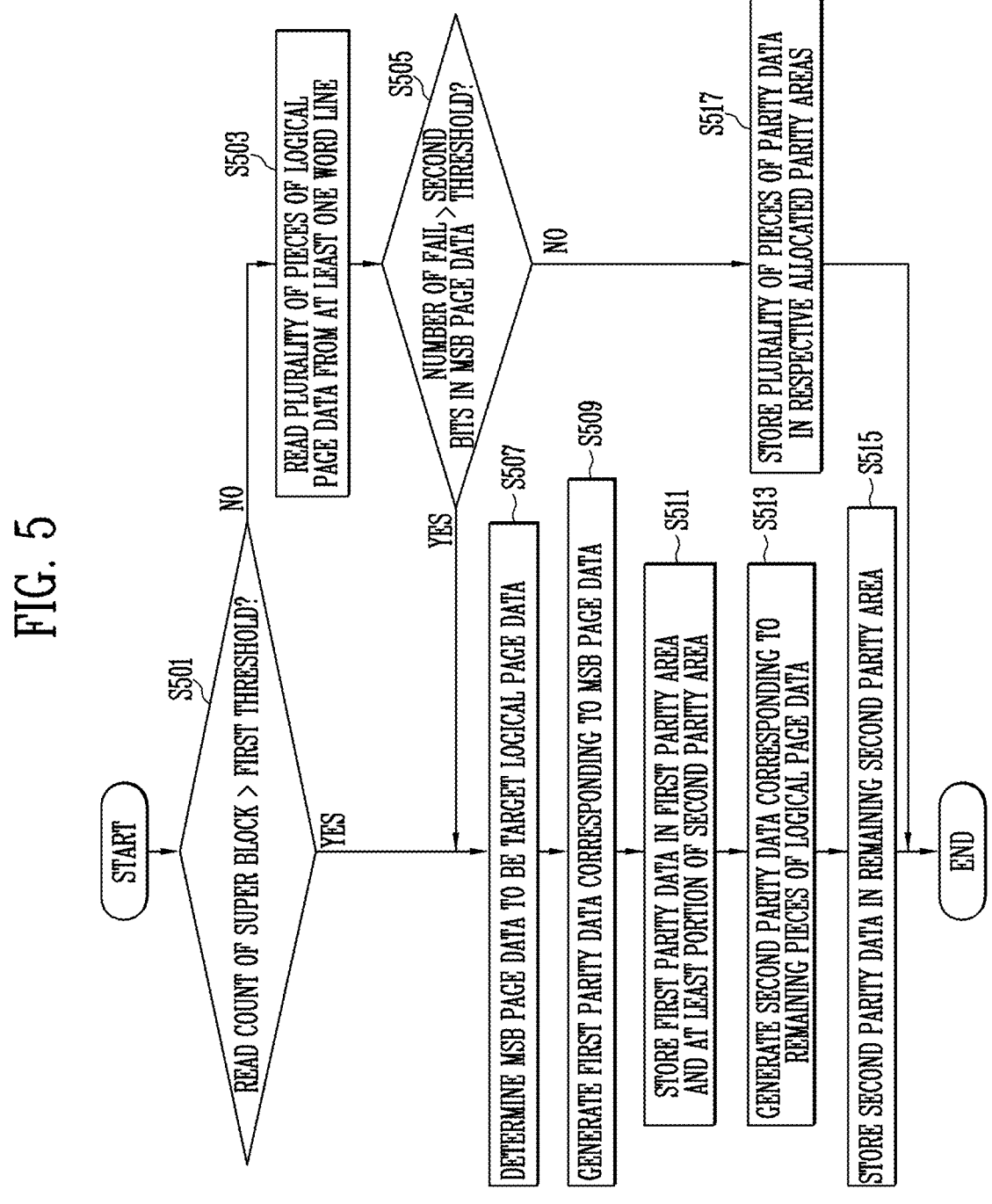
FIG. 5 is a flowchart illustrating an example of a method of storing parity data based on an embodiment of the disclosed technology.

FIG. 5 is a flowchart illustrating an example of a method of storing parity data based on an embodiment of the disclosed technology. FIG. 5 shows operations S203 and S205 of FIG. 2. The method illustrated in FIG. 5 may be performed by, for example, the storage device 50 illustrated in FIG. 1.

In some implementations, as shown in FIG. 5, logical page data with a higher probability of read failure than other pieces of logical page data due to the read disturbance phenomenon, which was described with reference to FIG. 4, is determined and parity data corresponding to the determined logical page data is stored.

Referring to FIG. 5, at S501, the storage device 50 may determine whether a read count of any one super block is greater than a first threshold.

Based on the result of determination at S501, when the read count is greater than the first threshold, the storage device 50 may perform an operation S507. On the other hand, when the read count is less than or equal to the first threshold, the storage device 50 may perform step S503.

At S503, the storage device 50 may read a plurality of pieces of logical page data from at least one word line connected to the super block. For example, the storage device 50 may perform a vulnerable word line read operation. Here, the vulnerable word line read operation may be an operation of reading at least one word line determined to be a vulnerable word line based on a preset criterion. For example, the vulnerable word line may be determined depending on the position, characteristic, or structure of each word line.

In an embodiment, the storage device 50 may determine target logical page data based on the number of fail bits included in a plurality of pieces of read logical page data.

In some implementations, at S505, the storage device 50 may determine whether the number of fail bits included in MSB page data, among the plurality of pieces of read logical page data, is greater than a second threshold. Here, the fail bits may be data bits that exceed a specific voltage level while the threshold voltages of memory cells are changing, and may be data bits to be corrected through an error correction operation during a read operation.

Based on the result of determination at S505, when the number of fail bits included in the MSB page data is greater than the second threshold, the storage device 50 may perform an operation S507. At S507, the storage device 50 may determine the MSB page data, among the plurality of pieces of logical page data, to be the target logical page data. For example, the storage device 50 may determine that the MSB page data is logical page data with a higher probability of failure than other pieces of logical page data during the read operation.

At S509, the storage device 50 may generate first parity data corresponding to the MSB page data.

In an embodiment, the storage device 50 may generate first sub-parity data corresponding to at least a portion of the MSB page data and second sub-parity data corresponding to the remaining MSB page data, other than at least the portion of the MSB page data.

At S511, the storage device 50 may store the first parity data in a first parity area allocated to the first parity data and in at least a portion of a second parity area allocated to the remaining pieces of parity data other than the first parity data.

In an embodiment, the storage device 50 may store the first sub-parity data and the second sub-parity data in the first parity area and at least a portion of the second parity area.

At S513, the storage device 50 may generate second parity data corresponding to the remaining pieces of logical page data.

At S515, the storage device 50 may store the second parity data in the remaining second parity area other than at least the portion of the second parity area.

In some implementations, based on the result of determination at S505, when the number of fail bits included in the MSB page data is less than or equal to the second threshold, the storage device 50 may perform an operation S517.

At S517, the storage device 50 may store the plurality of pieces of parity data in respective parity areas allocated thereto.

Figure 6:
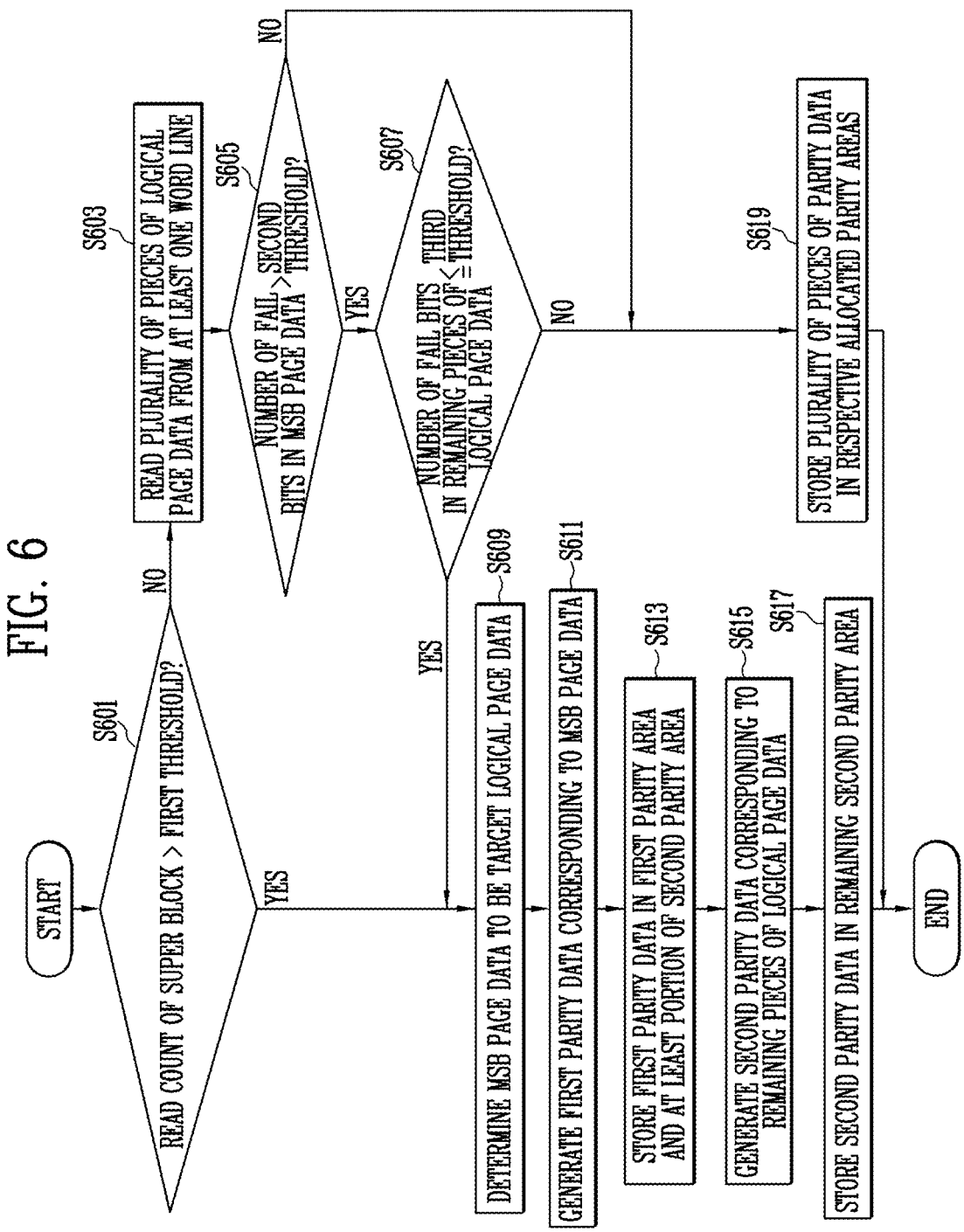
FIG. 6 is a flowchart illustrating an example of a method of storing parity data based on an embodiment of the disclosed technology.

FIG. 6 is a flowchart illustrating an example of a method of storing parity data based on an embodiment of the disclosed technology. FIG. 6 shows operations S203 and S205 of FIG. 2. The method illustrated in FIG. 6 may be performed by, for example, the storage device 50 illustrated in FIG. 1. In some implementations, as shown in FIG. 6, a comparison operation of determining target logical page data is further added to the embodiment of FIG. 5. Because the operations S601, S603, S605, S609, S611, S613, S615, S617, and S619 of FIG. 6 are identical to the operations S501, S503, S505, S507, S509, S511, S513, S515, and S517 of FIG. 5, detailed descriptions thereof will be omitted.

Referring to FIG. 6, based on the result of determination at S605, when the number of fail bits included in the MSB page data is greater than the second threshold, the storage device 50 may perform an operation S607.

At S607, the storage device 50 may determine whether the number of fail bits included in the remaining pieces of logical page data among the plurality of pieces of read logical page data is less than or equal to a third threshold less than the second threshold. Here, the remaining pieces of logical page data may include LSB page data and CSB page data, other than the MSB page data.

Based on the result of determination at S607, when the number of fail bits included in the remaining pieces of logical page data is less than or equal to the third threshold, the storage device 50 may perform an operation S609. On the other hand, when the number of fail bits included in the remaining pieces of logical page data is greater than the third threshold, the storage device 50 may perform an operation S619.

In some implementations, although the criterion for determination is set to the third threshold at S607 of FIG. 6, the disclosed technology is not limited thereto, and the criterion for determination may be variously set. For example, at S607, the storage device 50 may determine whether the number of fail bits included in the remaining pieces of logical page data is less than or equal to the second threshold. Based on the result of determination at S607, when the number of fail bits included in the remaining pieces of logical page data is less than or equal to the second threshold, the storage device 50 may perform an operation S609. On the other hand, when the number of fail bits included in the remaining pieces of logical page data is greater than the second threshold, the storage device 50 may perform step S619.

That is, operations S605 and S607 may be the operations of determining whether only the MSB page data among the plurality of pieces of logical page data has a large number of fail bits, or determining whether not only the MSB page data but also the remaining pieces of logical page data have a large number of fail bits. Accordingly, the storage device 50 may store parity data through operations S609 to S617 when only the MSB page data has a large number of fail bits, and may store parity data through an operation S619 when the remaining pieces of logical page data also have a large number of fail bits.

Figure 7A:
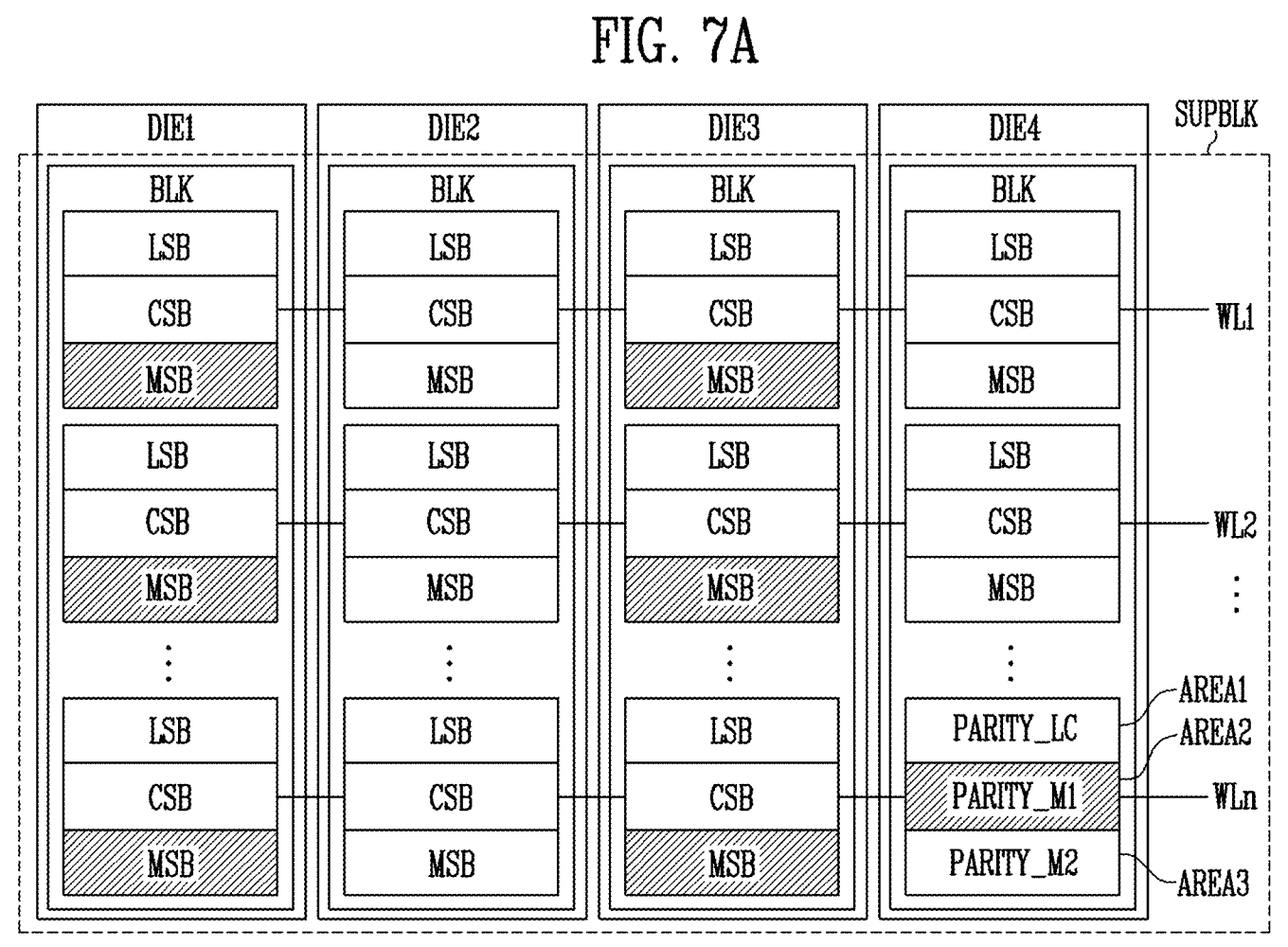
Figure 7B:
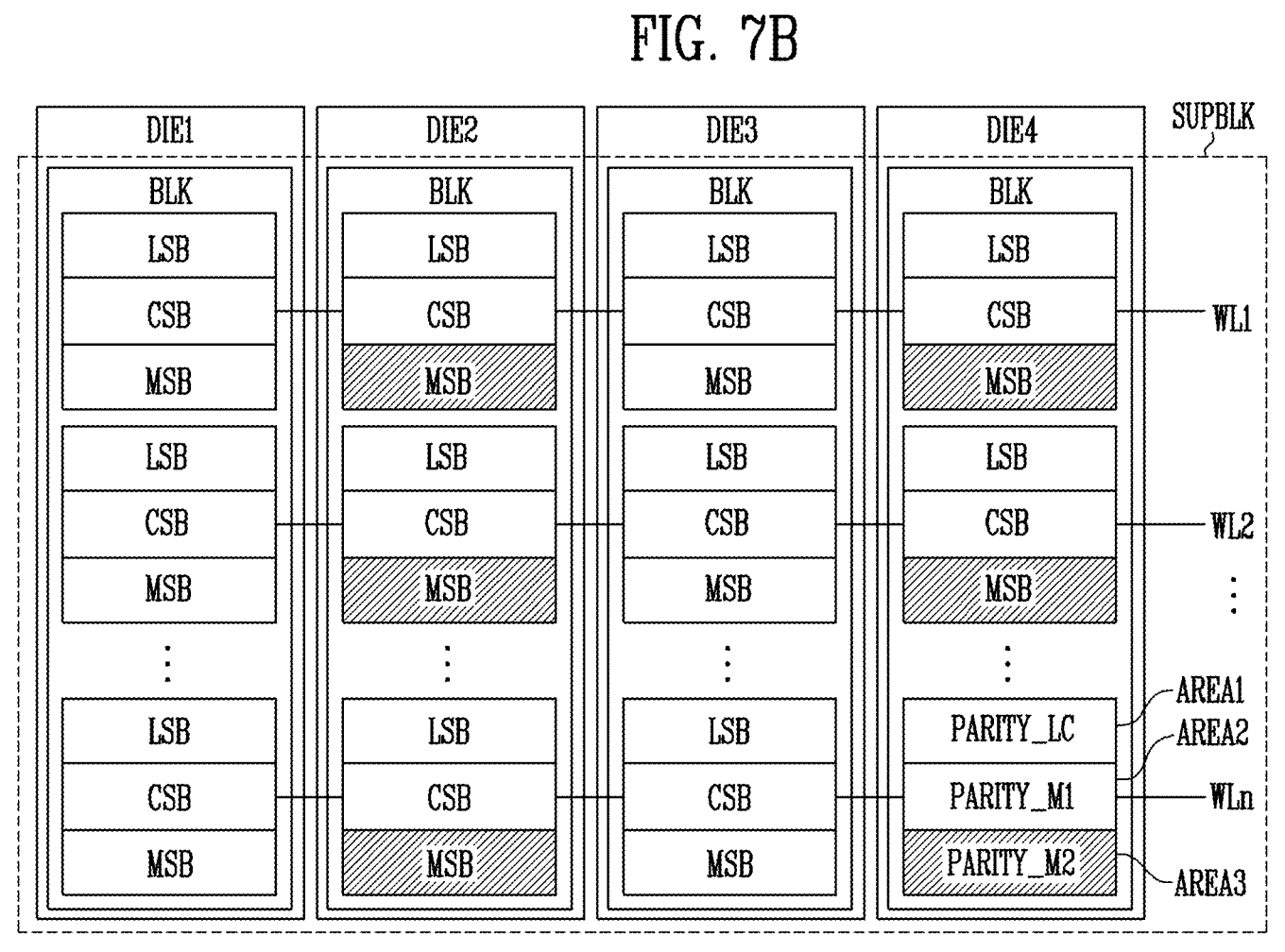
Figure 7C:
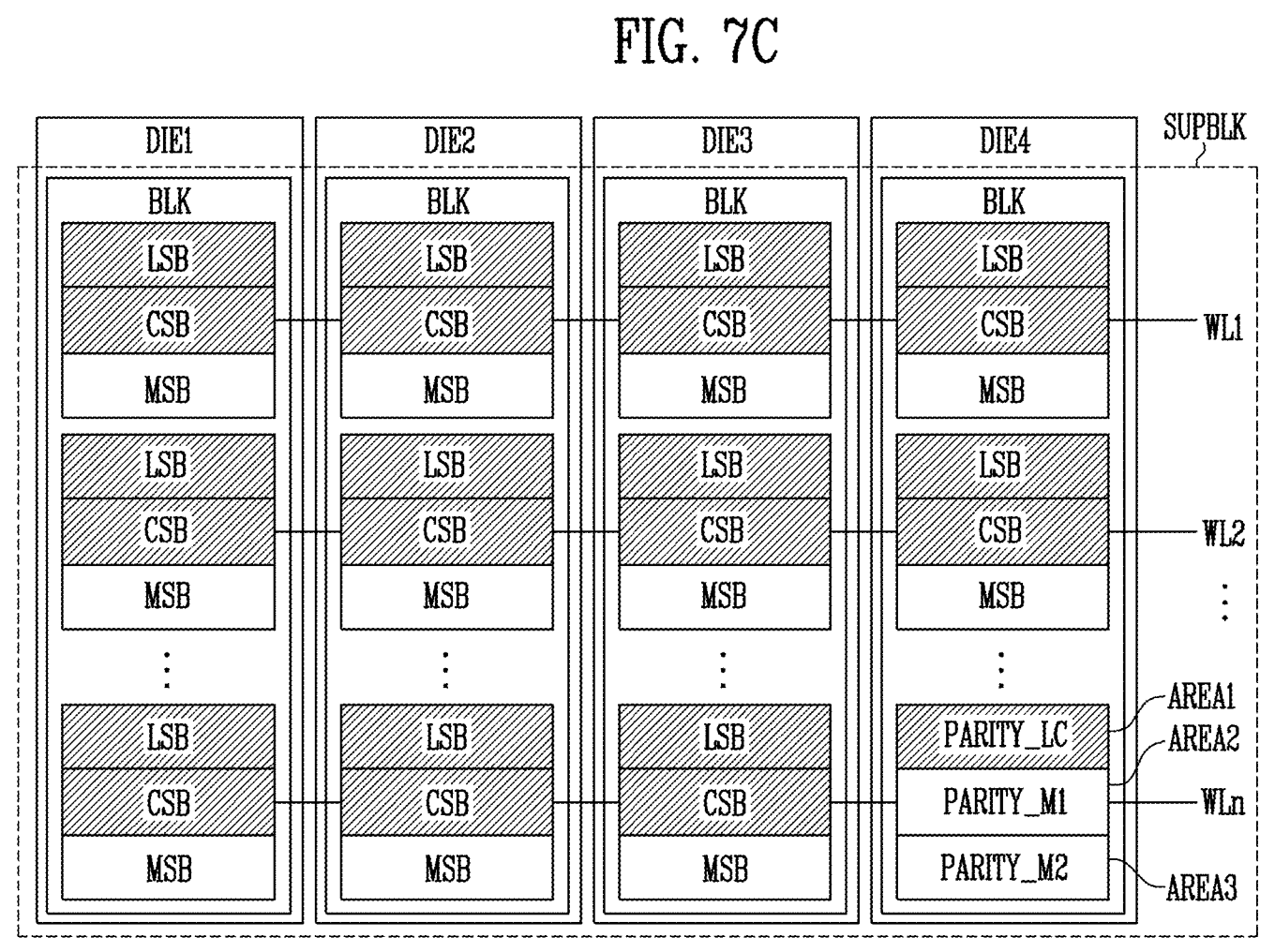

FIGS. 7A to 7C are diagrams illustrating an example of a method of storing parity data based on an embodiment of the disclosed technology. In some implementations, FIGS. 7A to 7C are diagrams for explaining an example in which parity data is stored through operations S507 to S515 of FIG. 5 or operations S609 to S617 of FIG. 6.

Referring to FIG. 7A, the storage device 50 may generate first sub-parity data PARITY_M1 corresponding to at least a portion of MSB page data. For example, the storage device 50 may generate first sub-parity data PARITY_M1 corresponding to MSB page data, included in memory blocks BLK of dies DIE1 and DIE3 located at odd-numbered positions, among pieces of MSB page data.

In an embodiment, the storage device 50 may perform a data recovery operation on the MSB page data included in the memory blocks BLK of the dies DIE1 and DIE3 located at the odd-numbered positions based on the first sub-parity data PARITY_M1.

In an embodiment, the storage device 50 may store the first sub-parity data PARITY_M1 in a second parity area AREA2.

Referring to FIG. 7B, the storage device 50 may generate second sub-parity data PARITY_M2 corresponding to the remaining MSB page data other than at least the portion of the MSB page data. For example, the storage device 50 may generate second sub-parity data PARITY_M2 corresponding to the MSB page data, included in the memory blocks BLK of dies DIE2 and DIE4 located at even-numbered positions, among the pieces of MSB page data.

In an embodiment, the storage device 50 may perform a data recovery operation on the MSB page data included in the memory blocks BLK of the dies DIE2 and DIE4 located at the even-numbered positions based on the second sub-parity data PARITY_M2.

In an embodiment, the storage device 50 may store the second sub-parity data PARITY_M2 in a third parity area AREA3.

That is, the MSB page data may be divided into two groups, and parity data corresponding to MSB page data in each group may be individually generated, and thus a data recovery probability for the MSB page data may be increased. Furthermore, although the second parity area AREA2 is an area allocated to the CSB parity data, the MSB page data has a higher probability of read failure, and thus the first sub-parity data PARITY_M1 may be stored in the second parity area AREA2, whereby the data recovery probability for the MSB page data may be improved.

In some implementations, although the above-described examples of FIGS. 7A and 7B are described in which the first sub-parity data PARITY_M1 is stored in the second parity area AREA2, and the second sub-parity data PARITY_M2 is stored in the third parity area AREA3, the disclosed technology is not limited thereto. For example, each of the first sub-parity data PARITY_M1 and the second sub-parity data PARITY_M2 may be stored in any one of the plurality of parity areas AREA1 to AREA3.

Furthermore, although the above-described examples of FIGS. 7A and 7B describe the first sub-parity data PARITY_M1 corresponds to the MSB page data included in the memory blocks BLK of the dies DIE1 and DIE3 located at odd-numbered positions and second sub-parity data PARI- TY_M2 correspond to the MSB page data included in the memory blocks BLK of the dies DIE2 and DIE4 located at even-numbered positions, the disclosed technology is not limited thereto. In an example, the first sub-parity data PARITY_M1 may correspond to MSB page data included in the memory block BLK of at least one of the plurality of dies DIE1 to DIE4, and the second sub-parity data PARITY_M2 may correspond to MSB page data included in the memory blocks BLK of the remaining memory dies. In an example, the first sub-parity data PARITY_M1 may correspond to MSB page data included in at least one of the plurality of word lines WL1 to WLn, and the second sub-parity data PARITY_M2 may correspond to MSB page data included in the remaining word lines.

Furthermore, although, in the above-described examples of FIGS. 7A and 7B, an example in which the first parity data corresponding to the MSB page data is composed of two pieces of sub-parity data has been described, the disclosed technology is not limited thereto. For example, the first parity data may be composed of at least two pieces of sub-parity data.

Referring to FIG. 7C, the storage device 50 may generate pieces of parity data PARITY_LC corresponding to the LSB page data and the CSB page data, other than the MSB page data. For example, the storage device 50 may generate pieces of parity data PARITY_LC corresponding to the LSB page data and the CSB page data included in the memory blocks BLK of the plurality of dies DIE1 to DIE4.

In an embodiment, the storage device 50 may store the parity data PARITY_LC in the first parity area AREA1.

In an embodiment, the storage device 50 may perform a data recovery operation on the LSB page data and the CSB page data based on the parity data PARITY_LC.

Although some of the examples above describe that the parity data PARITY_LC is stored in the first parity area AREA1, the disclosed technology is not limited thereto. For example, the parity data PARITY_LC may be stored in any one of the plurality of parity areas AREA1 to AREA3.

Because the plurality of word lines WL1 to WLn have different characteristics, the degrees of read disturbance and data retention loss may be different from each other for respective word lines. Therefore, the plurality of pages, included in different dies and connected to the same word line, may have a similar probability of error occurrence. In this case, when errors simultaneously occur in the corresponding pages in the case where parity areas are allocated on a word line basis, the probability that data can be recovered may be decreased. Therefore, based on an embodiment of the disclosed technology, parity areas are allocated on a die basis, and thus a data recovery probability may be increased.

Figure 8:
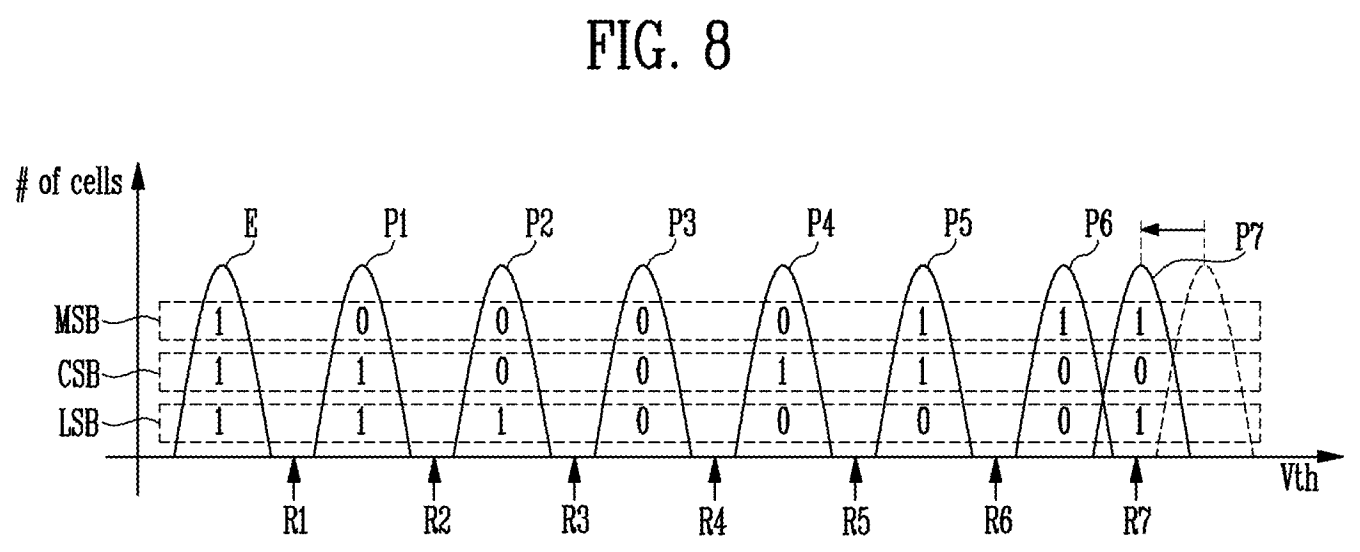

FIG. 8 is a diagram illustrating an example in which threshold voltages are shifted due to a data retention loss phenomenon based on an embodiment of the disclosed technology.

Referring to FIG. 8, a horizontal axis denotes threshold voltages of memory cells and a vertical axis denotes the number of memory cells.

The data retention loss phenomenon may refer to the decrease in the threshold voltages of memory cells over time after programming is performed. In particular, memory cells in a seventh program state P7 may exhibit a larger threshold voltage decrease than memory cells in other states. In this case, when a read operation is performed on the corresponding memory cells, the probability that the read operation will fail may be high.

For example, the memory cells in the seventh program state P7 and the memory cells in the sixth program state P6 may be different from each other in LSB page data and may be identical to each other in MSB page data and CSB page data. In this case, the memory cells in the seventh program state P7 and the memory cells in the sixth program state P6 may be distinguished from each other based on the seventh read voltage R7. However, when the threshold voltages of the memory cells in the seventh program state P7 decrease, it is impossible to accurately distinguish the memory cells in the seventh program state P7 from the memory cells in the sixth program state P6, thus making it difficult to accurately read pieces of LSB page data having different values. Accordingly, the LSB page data may have a higher probability of read failure.

Figure 9:
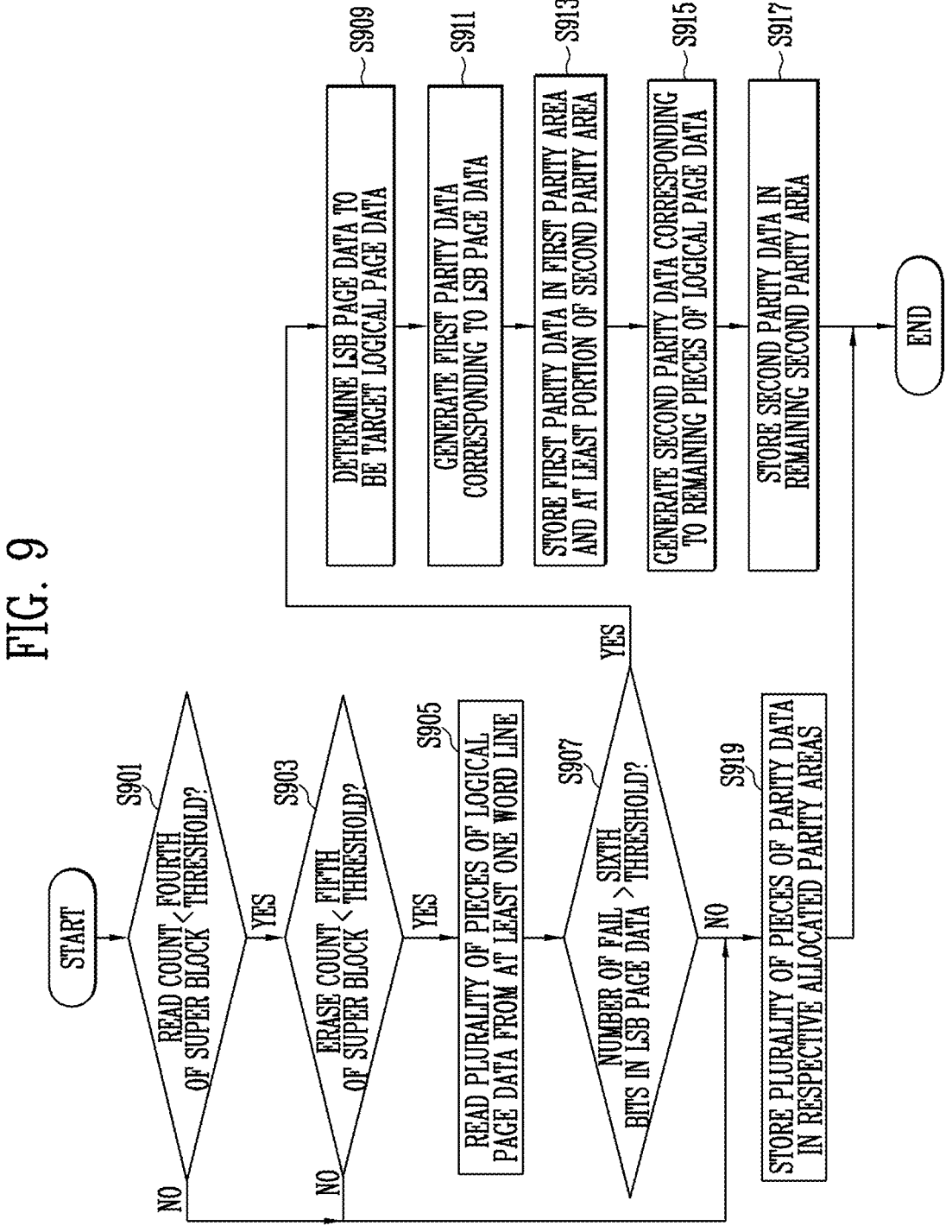
FIG. 9 is a flowchart illustrating an example of a method of storing parity data based on an embodiment of the disclosed technology.

FIG. 9 is a flowchart illustrating an example of a method of storing parity data based on an embodiment of the disclosed technology. FIG. 9 shows operations S203 and S205 of FIG. 2. The method illustrated in FIG. 9 may be performed by, for example, the storage device 50 illustrated in FIG. 1.

In some implementations, as shown in FIG. 9, logical page data with a higher probability of read failure than other pieces of logical page data due to the retention phenomenon, which was described with reference to FIG. 8, is determined and parity data corresponding to the determined logical page data is stored.

Referring to FIG. 9, at S901, the storage device 50 may determine whether a read count of any one super block is less than a fourth threshold. In an embodiment, the fourth threshold may refer to a condition value at which a wear leveling operation is triggered.

Based on the result of determination at S901, when the read count is less than the fourth threshold, the storage device 50 may perform an operation S903. On the other hand, when the read count is equal to or greater than the fourth threshold, the storage device 50 may perform an operation S919.

At S903, the storage device 50 may determine whether an erase count of the super block is less than a fifth threshold.

Based on the result of determination at S903, when the read count is less than the fifth threshold, the storage device 50 may perform an operation S905. On the other hand, when the read count is equal to or greater than the fifth threshold, the storage device 50 may perform an operation S919.

At S905, the storage device 50 may read a plurality of pieces of logical page data from at least one word line connected to the super block. For example, the storage device 50 may perform a vulnerable word line read operation.

In an embodiment, the storage device 50 may determine target logical page data based on the number of fail bits included in a plurality of pieces of read logical page data.

In some implementations, at S907, the storage device 50 may determine whether the number of fail bits included in LSB page data, among the plurality of pieces of read logical page data, is greater than a sixth threshold.

Based on the result of determination at S907, when the number of fail bits included in the LSB page data is greater than the sixth threshold, the storage device 50 may perform step S909.

At S909, the storage device 50 may determine the LSB page data, among the plurality of pieces of logical page data, to be the target logical page data. For example, the storage device 50 may determine that the LSB page data is logical page data with a higher probability of failure than other pieces of logical page data during the read operation.

At S911, the storage device 50 may generate first parity data corresponding to the LSB page data.

In an embodiment, the storage device 50 may generate first sub-parity data corresponding to at least a portion of the LSB page data and second sub-parity data corresponding to the remaining LSB page data, other than at least the portion of the LSB page data.

At S913, the storage device 50 may store the first parity data in a first parity area allocated to the first parity data and in at least a portion of a second parity area allocated to the remaining pieces of parity data other than the first parity data.

In an embodiment, the storage device 50 may store the first sub-parity data and the second sub-parity data in the first parity area and at least a portion of the second parity area.

At S915, the storage device 50 may generate second parity data corresponding to the remaining pieces of logical page data.

At S917, the storage device 50 may store the second parity data in the remaining second parity area other than at least the portion of the second parity area.

In some implementations, based on the result of determination at S907, when the number of fail bits included in the LSB page data is less than or equal to the sixth threshold, the storage device 50 may perform an operation S919.

At S919, the storage device 50 may store the plurality of pieces of parity data in respective parity areas allocated thereto.

Figure 10:
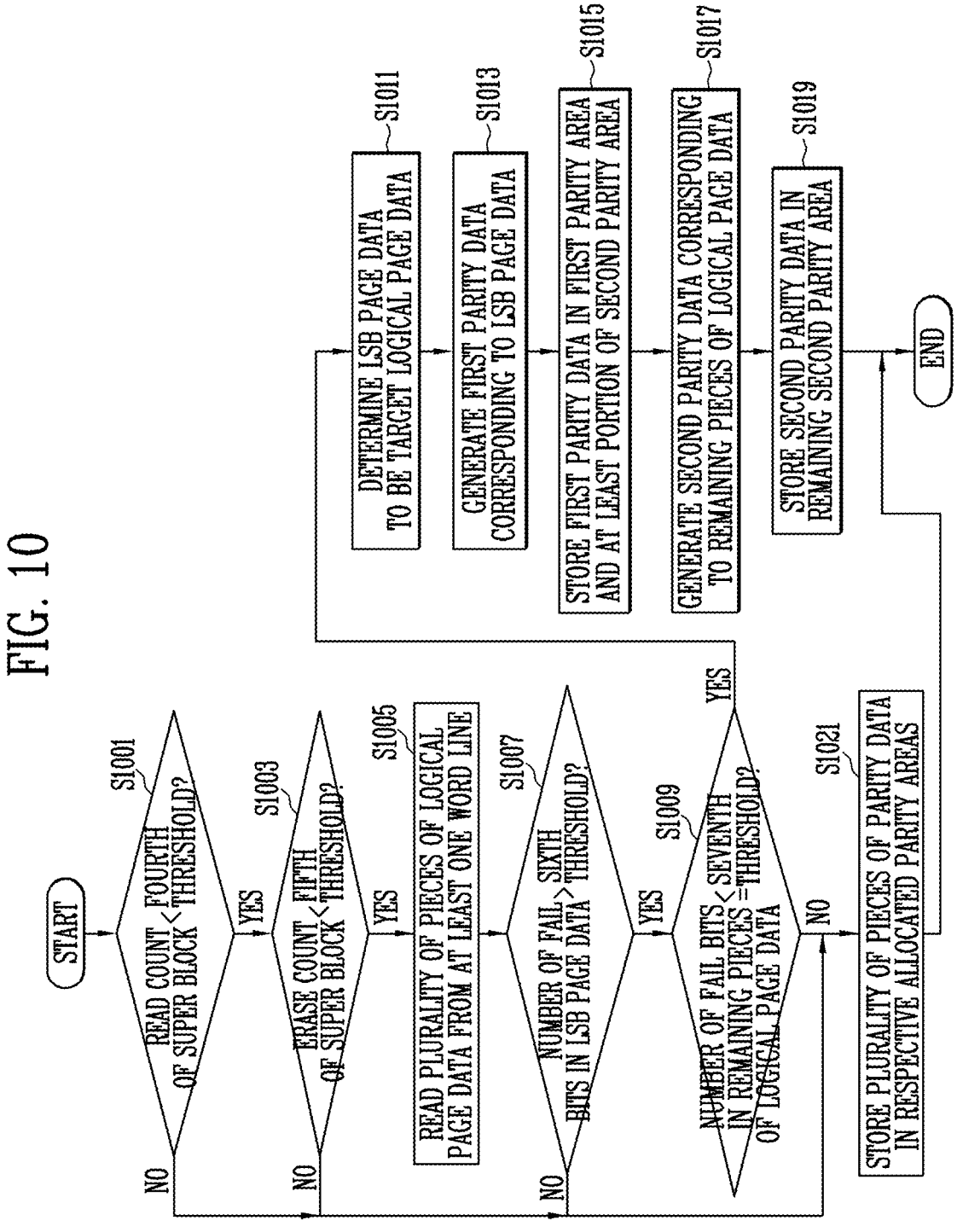
FIG. 10 is a flowchart illustrating an example of a method of storing parity data based on an embodiment of the disclosed technology.

FIG. 10 is a flowchart illustrating an example of a method of storing parity data based on an embodiment of the disclosed technology. FIG. 10 shows operations S203 and S205 of FIG. 2. The method illustrated in FIG. 10 may be performed by, for example, the storage device 50 illustrated in FIG. 1. In some implementations, as shown in FIG. 10, a comparison operation of determining target logical page data is further added to the embodiment of FIG. 9. Because the operations S1001, S1003, S1005, S1007, S1011, S1013, S1015, S1017, S1019, and S1021 of FIG. 10 are identical to the operations S901, S903, S905, S907, S909, S911, S913, S915, S917, and S919 of FIG. 9, detailed description thereof will be omitted.

Referring to FIG. 10, based on the result of determination at S1007, when the number of fail bits included in the LSB page data is greater than the sixth threshold, the storage device 50 may perform step S1009.

At S1009, the storage device 50 may determine whether the number of fail bits included in the remaining pieces of logical page data among the plurality of pieces of read logical page data is less than or equal to a seventh threshold. Here, the remaining pieces of logical page data may include MSB page data and CSB page data, other than the LSB page data.

Based on the result of determination at S1009, when the number of fail bits included in the remaining pieces of logical page data is less than or equal to the seventh threshold, the storage device 50 may perform an operation S1011. On the other hand, when the number of fail bits included in the remaining pieces of logical page data is greater than the seventh threshold, the storage device 50 may perform an operation S1021.

In some implementations, although the criterion for determination is set to the seventh threshold at S1009 of FIG. 10, the disclosed technology is not limited thereto, and the criterion for determination may be variously set. For example, at S1009, the storage device 50 may determine whether the number of fail bits included in the remaining pieces of logical page data is less than or equal to the sixth threshold. Based on the result of determination at S1009, when the number of fail bits included in the remaining pieces of logical page data is less than or equal to the sixth threshold, the storage device 50 may perform an operation S1011. On the other hand, when the number of fail bits included in the remaining pieces of logical page data is greater than the sixth threshold, the storage device 50 may perform an operation S1021.

That is, operations S1007 and S1009 may be the operations of determining whether only the LSB page data among the plurality of pieces of logical page data has a large number of fail bits, or determining whether not only the LSB page data but also the remaining pieces of logical page data have a large number of fail bits. Accordingly, the storage device 50 may store parity data through operations S1011 to S1019 when only the LSB page data has a large number of fail bits, and may store parity data through an operation S1021 when the remaining pieces of logical page data also have a large number of fail bits.

In some implementations, the first threshold to the seventh threshold, described with reference to FIGS. 5, 6, 9, and 10, may be values identical to or different from each other. The first threshold to seventh threshold may be variously set based on embodiments.

Figure 11A:
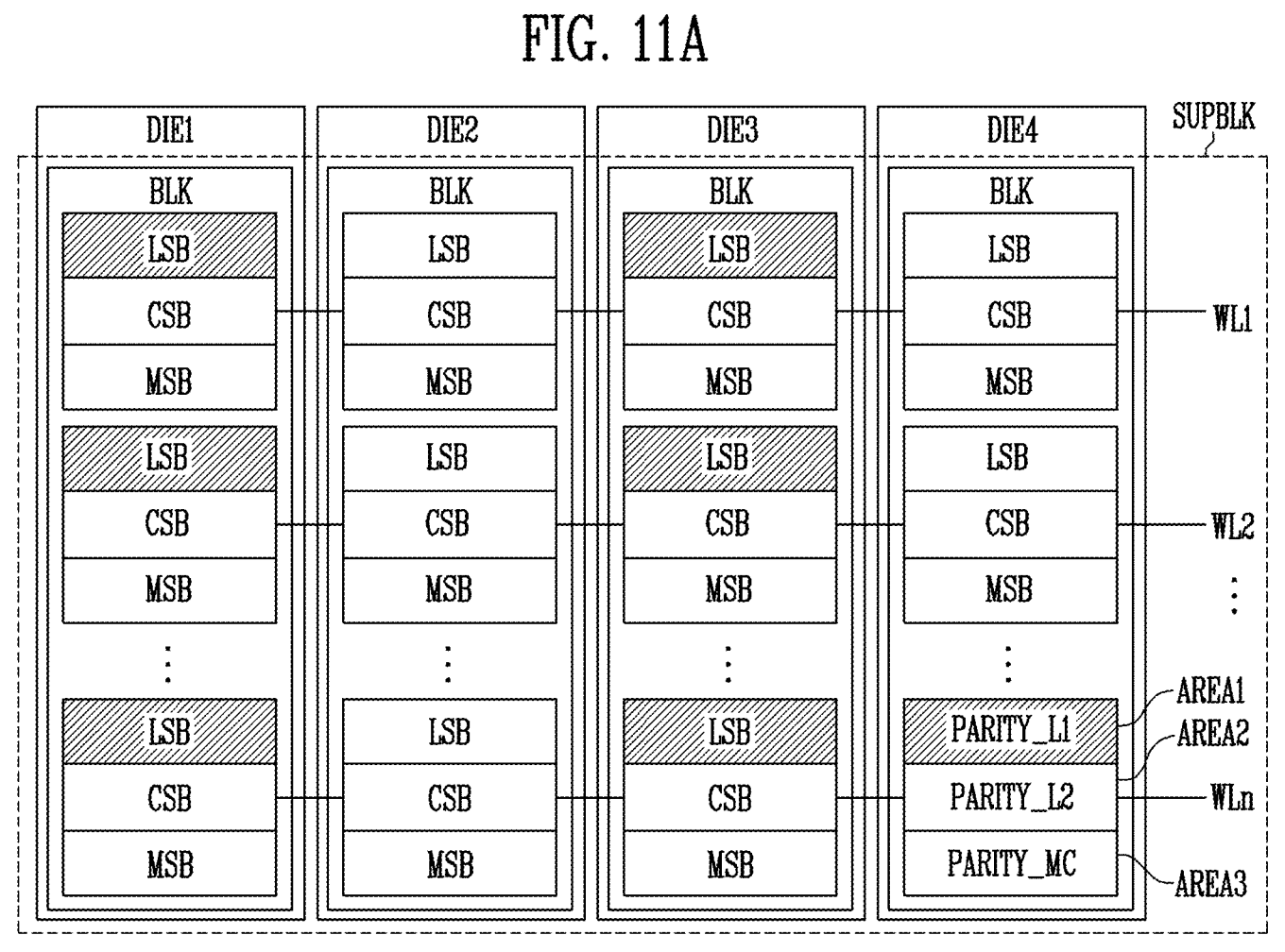
Figure 11B:
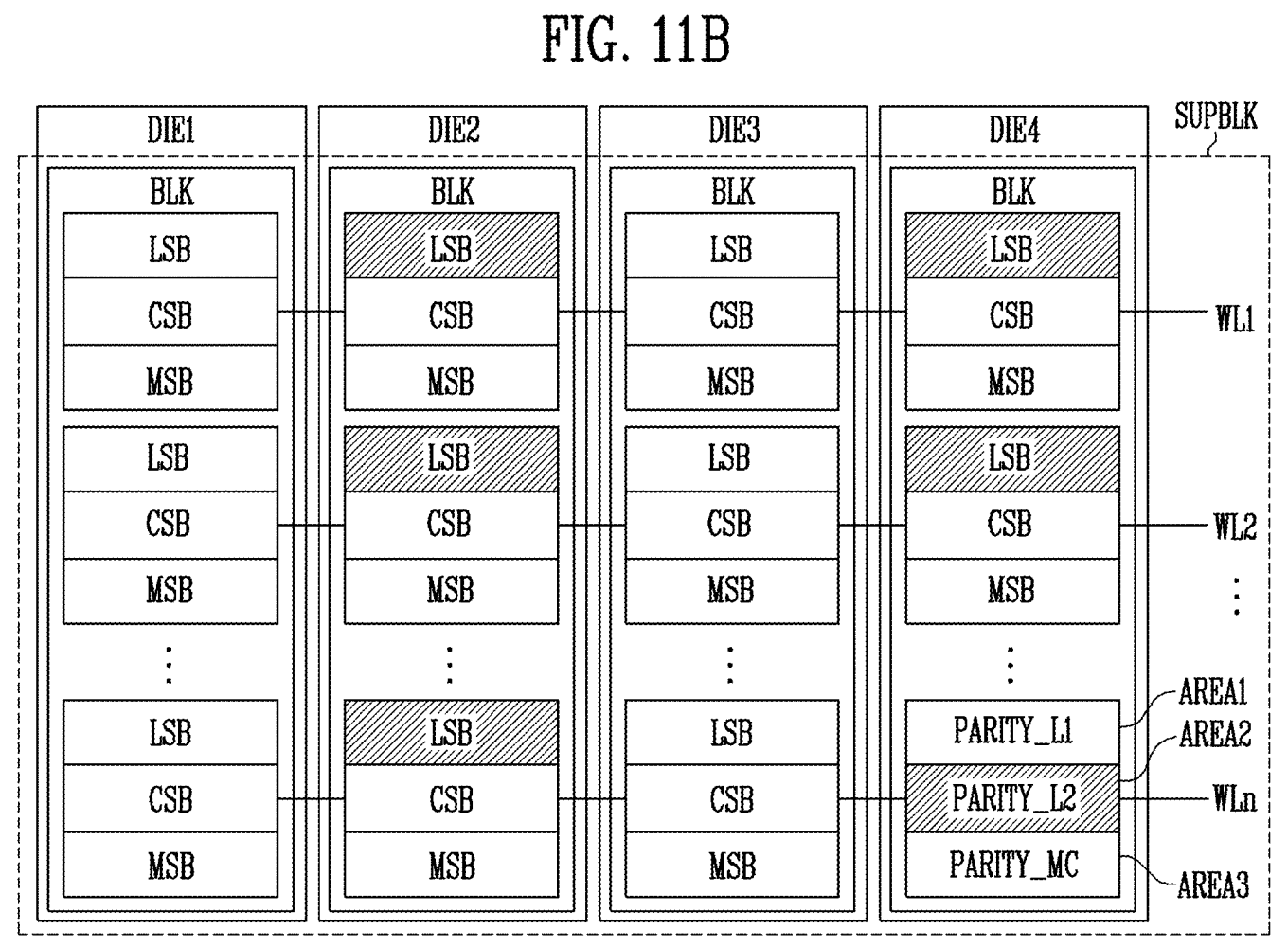
Figure 11C:
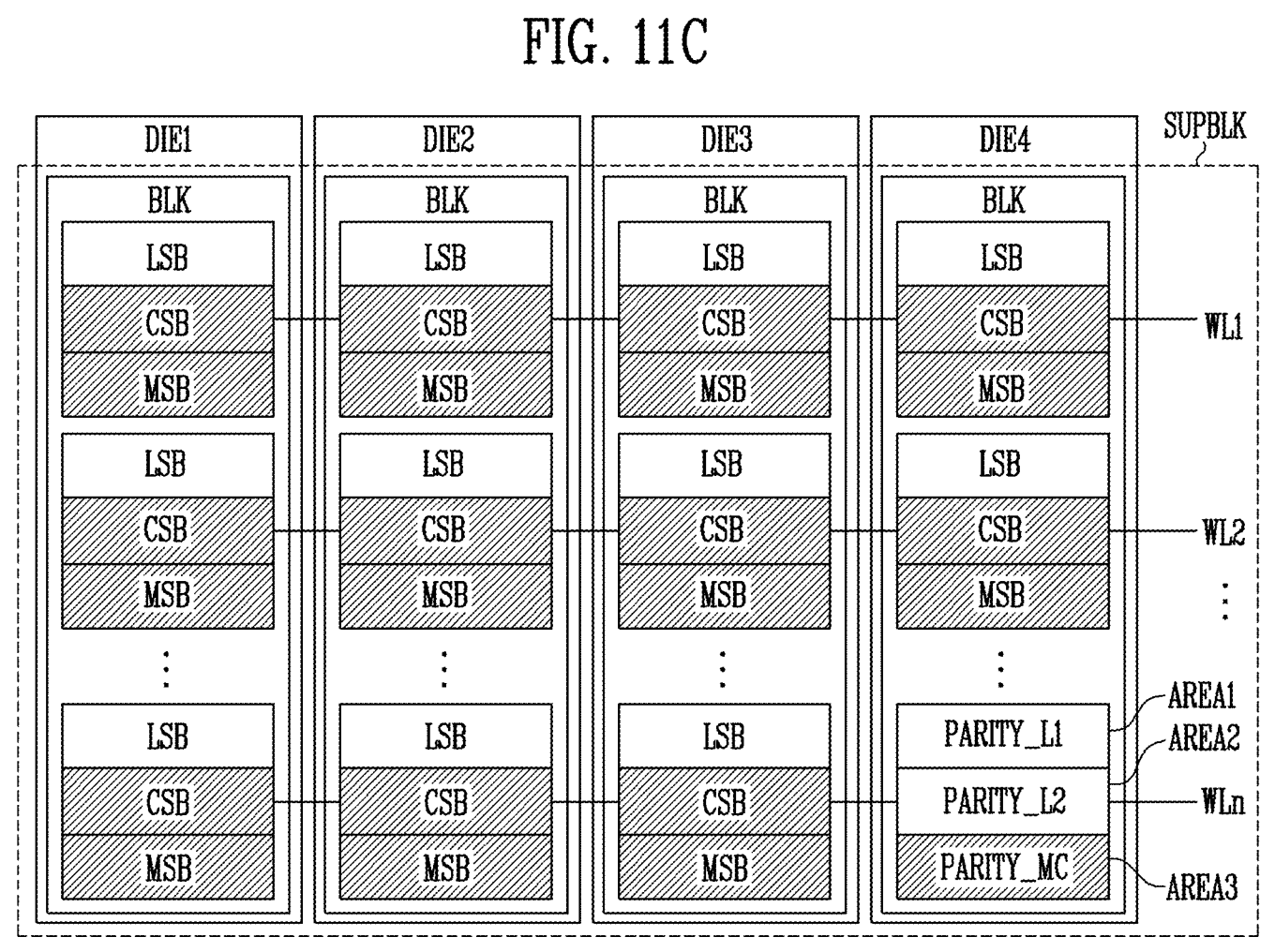

FIGS. 11A to 11C are diagrams illustrating an example of a method of storing parity data based on an embodiment of the disclosed technology. In some implementations, FIGS. 11A to 11C are diagrams for explaining an example in which parity data is stored through operations S909 to S917 of FIG. 9 or operations S1011 to S1019 of FIG. 10.

Referring to FIG. 11A, the storage device 50 may generate first sub-parity data PARITY_L1 corresponding to at least a portion of LSB page data. For example, the storage device 50 may generate first sub-parity data PARITY_L1 corresponding to LSB page data, included in memory blocks BLK of dies DIE1 and DIE3 located at odd-numbered positions, among pieces of LSB page data.

In an embodiment, the storage device 50 may perform a data recovery operation on the LSB page data included in the memory blocks BLK of the dies DIE1 and DIE3 located at the odd-numbered positions based on the first sub-parity data PARITY_L1.

In an embodiment, the storage device 50 may store the first sub-parity data PARITY_L1 in a first parity area AREA1.

Referring to FIG. 11B, the storage device 50 may generate second sub-parity data PARITY_L2 corresponding to the remaining LSB page data other than at least the portion of the LSB page data. For example, the storage device 50 may generate second sub-parity data PARITY_L2 corresponding to the LSB page data, included in the memory blocks BLK of dies DIE2 and DIE4 located at even-numbered positions, among the pieces of LSB page data.

In an embodiment, the storage device 50 may perform a data recovery operation on the LSB page data included in the memory blocks BLK of the dies DIE2 and DIE4 located at the even-numbered positions based on the second sub-parity data PARITY_L2.

In an embodiment, the storage device 50 may store the second sub-parity data PARITY_L2 in a second parity area AREA2.

That is, the LSB page data may be divided into two groups, and parity data corresponding to LSB page data in each group may be individually generated, and thus a data recovery probability for the LSB page data may be increased. Furthermore, although the second parity area AREA2 is an area allocated to the CSB parity data, the LSB page data has a higher probability of read failure, and thus the second sub-parity data PARITY_L2 may be stored in the second parity area AREA2, whereby the data recovery probability for the LSB page data may be improved.

In some implementations, although the examples of FIGS. 11A and 11B are described in which the first sub-parity data PARITY_L1 is stored in the first parity area AREA1, and the second sub-parity data PARITY_L2 is stored in the second parity area AREA2, the disclosed technology is not limited thereto. For example, each of the first sub-parity data PARITY_L1 and the second sub-parity data PARITY_L2 may be stored in any one of the plurality of parity areas AREA1 to AREA3.

Furthermore, although the above-described examples of FIGS. 11A and 11B are described in which the first sub-parity data PARITY_L1 corresponds to the LSB page data included in the memory blocks BLK of the dies DIE1 and DIE3 located at odd-numbered positions and second sub-parity data PARITY_L2 correspond to the LSB page data included in the memory blocks BLK of the dies DIE2 and DIE4 located at even-numbered positions, the disclosed technology is not limited thereto. In an example, the first sub-parity data PARITY_L1 may correspond to LSB page data included in at least one of the plurality of dies DIE1 to DIE4, and the second sub-parity data PARITY_L2 may correspond to LSB page data included in the remaining memory areas. In an example, the first sub-parity data PARITY_L1 may correspond to LSB page data included in at least one of the plurality of word lines WL1 to WLn, and the second sub-parity data PARITY_L2 may correspond to LSB page data included in the remaining word lines.

Furthermore, although the above-described examples of FIGS. 11A and 11B describe the first parity data corresponding to the LSB page data is composed of two pieces of sub-parity data, the disclosed technology is not limited thereto. For example, the first parity data may be composed of at least two pieces of sub-parity data.

Referring to FIG. 11C, the storage device 50 may generate pieces of parity data PARITY_MC corresponding to the MSB page data and the CSB page data, other than the LSB page data. For example, the storage device 50 may generate pieces of parity data PARITY_MC corresponding to the MSB page data and the CSB page data included in the plurality of dies DIE1 to DIE4.

In an embodiment, the storage device 50 may store the parity data PARITY_MC in the third parity area AREA3.

In an embodiment, the storage device 50 may perform a data recovery operation on the MSB page data and the CSB page data based on the parity data PARITY_MC.

Although some of the examples above describe that the parity data PARITY_MC is stored in the third parity area AREA3, the disclosed technology is not limited thereto. For example, the parity data PARITY_MC may be stored in any one of the plurality of parity areas AREA1 to AREA3.

Figure 12:
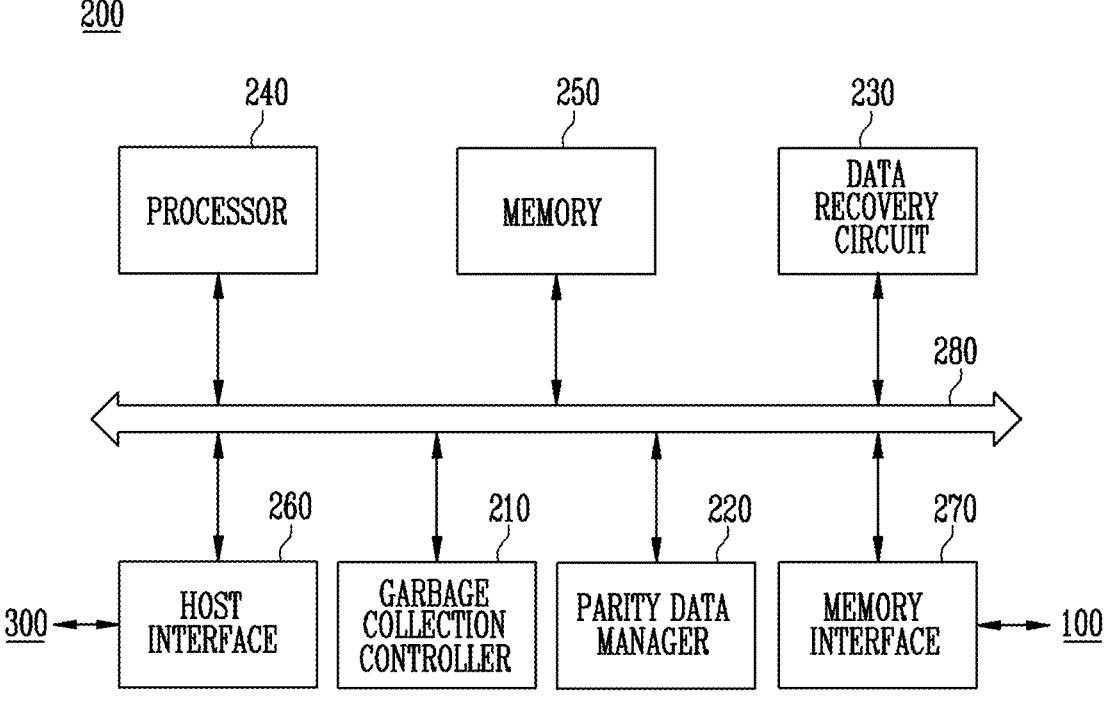
FIG. 12 is a diagram illustrating a memory controller based on an embodiment of the disclosed technology.

FIG. 12 is a diagram illustrating a memory controller based on an embodiment of the disclosed technology.

Referring to FIG. 12, a memory controller 200 may include a garbage collection controller 210, a parity data manager 220, a data recovery circuit 230, a processor 240, a memory 250, a host interface 260, a memory interface 270, and a communication bus 280. Because the garbage collection controller 210, the parity data manager 220, and the data recovery circuit 230 of FIG. 12 refer to the garbage collection controller 210, the parity data manager 220, and the data recovery circuit 230 of FIG. 1, detailed description thereof will be omitted.

The processor 240 may control the overall operation of the memory controller 200.

In an embodiment, the processor 240 may execute firmware, code or one or more instructions, which include various types of information required for the operation of the memory controller 200.

The memory 250 may be used as a buffer memory, a cache memory, a working memory, or the like.

Further, the memory 250 may store the firmware, code or one or more instructions including various types of information required for the operation of the memory controller 200.

The memory controller 200 may communicate with an external device (e.g., the host 300, an application processor or the like) through the host interface 260.

The memory controller 200 may communicate with the memory device 100 through the memory interface 270. The memory controller 200 may transmit a command, an address, a control signal, or the like to the memory device 100 and receive data from the memory device 100, through the memory interface 270.

The garbage collection controller 210, the parity data manager 220, the data recovery circuit 230, the processor 240, the memory 250, the host interface 260, and the memory interface 270 may communicate with each other through the communication bus 280.

In an embodiment, the parity data manager 220 may determine logical page data with a higher probability of read failure than other pieces of logical page data to be target logical page data. The parity data manager 220 may control the memory device 100 so that a parity area in which parity data corresponding to the determined target logical page data is stored is larger than a parity area in which parity data corresponding to the remaining logical page data is stored.

In some embodiments of the disclosed technology, storage devices and methods of operating the storage devices may exhibit improved data recovery performance.

The embodiments and implementations disclosed above are examples only, and thus various enhancements and variations to the disclosed embodiments and implementations and other embodiments and implementations can be made based on what is described and illustrated in this patent document.

What is claimed is:

1. A storage device, comprising:
   a memory device including a plurality of super blocks, each super block including: a plurality of logical pages configured to store a plurality of pieces of logical page data; and a plurality of parity areas configured to store a plurality of pieces of parity data corresponding to the plurality of pieces of logical page data; and
   a memory controller in communication with the memory device and configured to: determine target logical page data corresponding to a target logical page of the plurality of logical pages based on at least one of a read count or an erase count of a first super block of the plurality of super blocks; and control the memory device to store first parity data, corresponding to the target logical page data, in: (1) a first parity area of the plurality of parity areas that is allocated to the first parity data; and (2) at least a portion of a second parity area that is allocated to remaining pieces of parity data other than the first parity data.

2. The storage device according to claim 1, wherein:

the memory device comprises a plurality of dies, each of the plurality of dies including a plurality of planes, each of the plurality of planes including a plurality of memory blocks; and the first super block includes corresponding memory blocks of the plurality of memory blocks included in different dies among the plurality of dies, or corresponding memory blocks of the plurality of memory blocks included in different planes among the plurality of planes.

3. The storage device according to claim 1, wherein the target logical page data is logical page data with a higher probability of read failure, during read operation, than logical page data corresponding to other logical pages.

4. The storage device according to claim 1, wherein the memory controller is configured to, in response to determination that the read count is greater than a first threshold, determine MSB page data to be the target logical page data.

5. The storage device according to claim 1, wherein the memory controller is configured to: in response to determination that the read count is less than or equal to a first threshold, read the plurality of pieces of logical page data from at least one word line connected to the first super block; and determine the target logical page data based on a number of fail bits included in the read plurality of pieces of logical page data.

6. The storage device according to claim 5, wherein the memory controller is configured to, in response to determination that the number of fail bits, included in MSB page data among the read plurality of pieces of logical page data, is greater than a second threshold, determine the MSB page data to be the target logical page data.

7. The storage device according to claim 5, wherein the memory controller is configured to, in response to determination that i) the number of fail bits, included in MSB page data among the read plurality of pieces of logical page data, is greater than a second threshold and ii) a second number of fail bits, included in remaining pieces of logical page data other than the MSB page data among the read plurality of pieces of logical page data is less than or equal to the second threshold, determine the MSB page data to be the target logical page data.

8. The storage device according to claim 5, wherein the memory controller is configured to, in response to determination that i) the number of fail bits, included in MSB page data among the read plurality of pieces of logical page data, is greater than a second threshold and ii) a second number of fail bits, included in remaining pieces of logical page data other than the MSB page data among the read plurality of pieces of logical page data, is less than or equal to a third threshold that is less than the second threshold, determine the MSB page data to be the target logical page data.

9. The storage device according to claim 1, wherein the memory controller is configured to: in response to determination that i) the read count is less than a fourth threshold and ii) the erase count is less than a fifth threshold, read the plurality of pieces of logical page data from at least one word line connected to the first super block; and determine the target logical page data based on a number of fail bits included in the read plurality of pieces of logical page data.

10. The storage device according to claim 9, wherein the memory controller is configured to, in response to determination that the number of fail bits, included in LSB page data among the read plurality of pieces of logical page data, is greater than a sixth threshold, determine the LSB page data to be the target logical page data.

11. The storage device according to claim 9, wherein the memory controller is configured to, in response to determination that i) the number of fail bits, included in LSB page data among the read plurality of pieces of logical page data, is greater than a sixth threshold and ii) a second number of fail bits, included in remaining pieces of logical page data other than the LSB page data among the read plurality of pieces of logical page data, is less than or equal to the sixth threshold, determine the LSB page data to be the target logical page data.

12. The storage device according to claim 9, wherein the memory controller is configured to, in response to determination that i) the number of fail bits, included in LSB page data among the read plurality of pieces of logical page data, is greater than a sixth threshold and ii) a second number of fail bits, included in remaining pieces of logical page data other than the LSB page data among the read plurality of pieces of logical page data, is less than or equal to a seventh threshold that is less than the sixth threshold, determine the LSB page data to be the target logical page data.

13. The storage device according to claim 1, wherein the memory controller is configured to: generate second parity data corresponding to remaining pieces of logical page data, other than the target logical page data, among the plurality of pieces of logical page data; and control the memory device to store the second parity data in a remaining second parity area other than at least the portion of the second parity area.

14. The storage device according to claim 13, wherein the memory controller is configured to perform a data recovery operation on the remaining pieces of logical page data based on the second parity data.

15. The storage device according to claim 1, wherein the memory controller is configured to, in response to determination that an operation of migrating data from the first super block to a second super block is triggered, determine the target logical page data based on at least one of the read count or the erase count.

16. A method of operating a storage device, the storage device including a memory area including: a plurality of logical pages configured to store a plurality of pieces of logical page data; and a plurality of parity areas configured to store a plurality of pieces of parity data corresponding to the plurality of pieces of logical page data, the method comprising:

determining a read count of the memory area is greater than a first threshold;

determining most significant bit (MSB) page data, among the plurality of pieces of logical page data, to be target logical page data based on determining the read count of the memory area is greater than a first threshold;

generating first parity data corresponding to the target logical page data;

storing the first parity data i) in a first parity area, among the plurality of parity areas, that is allocated to the first parity data and ii) in at least a portion of a second parity area that is allocated to remaining pieces of parity data other than the first parity data;

generating second parity data corresponding to remaining pieces of logical page data; and storing the second parity data in a remaining second parity area other than at least the portion of the second parity area.

17. The method according to claim 16, further comprising:

reading the plurality of pieces of logical page data from at least one word line connected to a second memory area in response to determination that a second read count of the second memory area is less than or equal to the first threshold; and determining a second MSB page data to be a second target logical page data based on a number of fail bits included in the read plurality of pieces of logical page data.

18. A method of operating a storage device, the storage device including a memory area including: a plurality of logical pages configured to store a plurality of pieces of logical page data; and a plurality of parity areas configured to store a plurality of pieces of parity data corresponding to the plurality of pieces of logical page data, the method comprising:

determining a read count of the memory area is less than a first threshold;

determining an erase count of the memory area is less than a second threshold;

determining least significant bit (LSB) page data, among the plurality of pieces of logical page data, to be target logical page data based on determining i) the read count is less than the first threshold and ii) the erase count is less than the second threshold;

generating first parity data corresponding to the target logical page data;

storing the first parity data i) in a first parity area, among the plurality of parity areas, that is allocated to the first parity data and ii) in at least a portion of a second parity area that is allocated to remaining pieces of parity data other than the first parity data;

generating second parity data corresponding to remaining pieces of logical page data; and storing the second parity data in a remaining second parity area other than at least the portion of the second parity area.

19. The method according to claim 18, wherein determining the LSB page data to be the target logical page data comprises:

reading the plurality of pieces of logical page data from at least one word line connected to the memory area in response to determination that i) the read count is less than the first threshold and ii) the erase count is less than the second threshold; and determining the LSB page data to be the target logical page data based on a number of fail bits included in the read plurality of pieces of logical page data.

* * * * *